(12) United States Patent
Griffin et al.

(10) Patent No.: US 12,367,464 B2
(45) Date of Patent: Jul. 22, 2025

(54) PREDICTIVE DEVICE MAINTENANCE

(71) Applicant: International Business Machines Corporation, Armonk, NY (US)

(72) Inventors: Adam Lee Griffin, Dubuque, IA (US); Shikhar Kwatra, San Jose, CA (US); Matthew Alzamora, Poughkeepsie, NY (US); Patricia Wynne Mchann, Hernando, MS (US); Christopher Denis Hardt, Hyde Park, NY (US); David Beltran, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 17/009,290

(22) Filed: Sep. 1, 2020

(65) Prior Publication Data

US 2022/0067669 A1 Mar. 3, 2022

(51) Int. Cl.
*G06Q 10/20* (2023.01)
*G06F 16/93* (2019.01)
(Continued)

(52) U.S. Cl.
CPC .............. *G06Q 10/20* (2013.01); *G06F 16/93* (2019.01); *G06F 16/951* (2019.01);
(Continued)

(58) Field of Classification Search
None
See application file for complete search history.

(56) References Cited

U.S. PATENT DOCUMENTS 6,735,549 B2 * 5/2004 Ridolfo .............. G05B 23/0283
 702/181
7,124,059 B2 10/2006 Wetzer et al.
(Continued)

FOREIGN PATENT DOCUMENTS

WO WO02093279 A2 * 11/2002 ............. G05B 23/00
WO WO2014131029 A2 * 8/2014 ............. H04L 29/08
(Continued)

OTHER PUBLICATIONS

He, Qingsu, et al. "A privacy-preserving Internet of Things device management scheme based on blockchain." International Journal of Distributed Sensor Networks 14.11 (2018): 1550147718808750. (Year: 2018).*

(Continued)

*Primary Examiner* — Paul R Fisher
(74) *Attorney, Agent, or Firm* — Shackelford, McKinley & Norton, LLP

(57) ABSTRACT

A computer-implemented method, a computer program product for predictive device maintenance, and system for a plurality of Internet of Things (IoT) devices. One embodiment may comprise generating a risk score as a weighted measure of input data about an Internet of Things (IoT) device and a frequency of failure of the IoT device, determining an optimal time to trigger a predictive notification pertaining to the IoT device using the risk score, and at the determined optimal time, issuing the predictive notification. The risk score in some embodiments may indicate an estimate of loss of function of the IoT device.

20 Claims, 18 Drawing Sheets

(51) Int. Cl.
  *G06F 16/951* (2019.01)
  *G06F 40/205* (2020.01)
  *G06N 5/02* (2023.01)
  *G06Q 30/0282* (2023.01)
  *G16Y 10/75* (2020.01)
  *G16Y 40/20* (2020.01)

(52) U.S. Cl.
  CPC ............ *G06F 40/205* (2020.01); *G06N 5/02* (2013.01); *G06Q 30/0282* (2013.01); *G16Y 10/75* (2020.01); *G16Y 40/20* (2020.01)

(56) References Cited

U.S. PATENT DOCUMENTS

| | | | |
|---|---|---|---|
| 7,496,475 | B2 | 2/2009 | Byrne et al. |
| 9,413,827 | B2 | 8/2016 | Sharma et al. |
| 10,164,973 | B1* | 12/2018 | Prasad ................ H04L 63/0861 |
| 10,503,581 | B2 | 12/2019 | Justin et al. |
| 10,547,498 | B1* | 1/2020 | Garner, IV .......... H04L 41/0806 |
| 10,944,547 | B2 | 3/2021 | Tummalapenta |
| 11,032,239 | B1* | 6/2021 | Maria ................ H04L 61/5084 |
| 11,037,222 | B1* | 6/2021 | Natesh ............... G06Q 30/0631 |
| 2001/0027401 | A1* | 10/2001 | Klein ................ G08B 13/2482 705/333 |
| 2006/0224325 | A1* | 10/2006 | Conway ................ G16H 40/40 600/300 |
| 2009/0048941 | A1* | 2/2009 | Strassmann ........ G06Q 30/0625 705/26.62 |
| 2009/0265365 | A1* | 10/2009 | Evanitsky .............. G06Q 10/10 |
| 2013/0138533 | A1* | 5/2013 | Vartanian ............... G06Q 30/06 705/26.35 |
| 2015/0339586 | A1* | 11/2015 | Adjaoute ............... G06N 20/00 706/52 |
| 2016/0182309 | A1* | 6/2016 | Maturana ............. H04L 41/145 709/224 |
| 2017/0310747 | A1 | 10/2017 | Cohn et al. |
| 2018/0060159 | A1 | 3/2018 | Justin et al. |
| 2018/0183587 | A1* | 6/2018 | Won ........................ H04W 4/70 |
| 2018/0247515 | A1* | 8/2018 | Brady .................... G08B 25/08 |
| 2018/0314996 | A1* | 11/2018 | Singh ...................... H04L 67/12 |
| 2019/0007511 | A1 | 1/2019 | Rodriguez et al. |
| 2019/0019090 | A1* | 1/2019 | Chacko ................ G06Q 10/103 |
| 2019/0034936 | A1* | 1/2019 | Nolan ................... G06Q 20/42 |
| 2019/0324838 | A1* | 10/2019 | Chakraborty ....... G06F 11/0709 |
| 2020/0026589 | A1* | 1/2020 | Ghosh ................ G06F 11/0793 |
| 2020/0052882 | A1 | 2/2020 | Tummalapenta et al. |
| 2020/0073996 | A1* | 3/2020 | Wright ................... G06N 20/00 |
| 2020/0201950 | A1* | 6/2020 | Wang ..................... F03D 17/00 |
| 2020/0257917 | A1* | 8/2020 | Moore .................... H04N 7/188 |
| 2021/0374361 | A1* | 12/2021 | Wick ....................... G06F 40/58 |
| 2022/0045975 | A1* | 2/2022 | Flöther ................ H04L 51/216 |

FOREIGN PATENT DOCUMENTS

| | | | | |
|---|---|---|---|---|
| WO | WO2016081954 | A1 * | 5/2016 | ............... G06E 1/00 |
| WO | WO2017052578 | A1 * | 3/2017 | ............. G08B 25/10 |
| WO | WO2017203093 | A1 * | 11/2017 | ............ H04W 12/10 |
| WO | WO2018033953 | A1 * | 2/2018 | ............ G06F 3/048 |
| WO | WO2018126029 | A2 * | 7/2018 | ............. H04L 29/06 |
| WO | WO2019018672 | A1 * | 1/2019 | ............. G06F 15/00 |
| WO | WO2019231466 | A1 * | 12/2019 | ............ G06Q 10/06 |

OTHER PUBLICATIONS

Xiaoli Xu, Tao Chen, Mamoru Minami, Intelligent fault prediction system based on internet of things, Computers & Mathematics with Applications, vol. 64, Issue 5, 2012, pp. 833-839, ISSN 0898-1221, https://doi.org/10.1016/j.camwa.2011.12.049 (Year: 2012).*

J. K. P. Seng and K. L. - M. Ang, "Multimodal Emotion and Sentiment Modeling From Unstructured Big Data: Challenges, Architecture, & Techniques, " in IEEE Access, vol. 7, pp. 90982-90998, 2019, doi: 10.1109/ACCESS.2019.2926751. (Year: 2019).*

Naghavi et al., "A Proposed Architecture for Continuous Web Monitoring Through Online Crawling of Blogs", International Journal of UbiComp (IJU), vol. 3, No. 1, Jan. 2012, DOI:10.5121/iju. 2012.3102, 11 pages.

"NumPy Community Survey is LIVE!," NumPy, Printed Aug. 7, 2020, Copyright 2019-2020 NumPy, 6 pages, https://numpy.org/.

"Matplotlib: Visualization with Python," matplotlib, Last Updated Jul. 17, 2020, 4 pages, https://matplotlib.org/.

"pandas," Python Data Analysis Library, Printed Aug. 7, 2020, 1 page, https://pandas.pydata.org/.

"Natural Language Toolkit," Natural Language Toolkit, NLTK 3.5 documentation, Printed Aug. 7, 2020, 2 pages, https://www.nltk.org/.

Dwivedi, "NLP: Extracting the main topics from your dataset using LDA in minutes," Toward Data Science, Aug. 22, 2018, 3 pages, https://towardsdatascience.com/nlp-extracting-the-main-topics-from-your-dataset-using-lda-in-minutes-21486f5aa925.

"System and Method to "Replace Me"," IP.Com, An IP.com Prior Art Database Technical Disclosure, IP.com No. PCOM000243799D, IP.com Electronic Publication Date: Oct. 17, 2015, 3 pages.

"Focused Crawling," Scale Unlimited, Printed Aug. 7, 2020, 3 pages, https://www.scaleunlimited.com/about/focused-crawler/.

Mell et al., "The NIST Definition of Cloud Computing," Recommendations of the National Institute of Standards and Technology, U.S. Department of Commerce, Special Publication 800-145, Sep. 2011, 7 pages.

"Empowering the edge," Practical insights on a decentralized Internet of Things, IBM Institute for Business Value, Printed Aug. 27, 2020, 24 pages, https://www.ibm.com/downloads/cas/2NZLY7XJ.

"Empowering the edge," Use case abstract for the ADEPT proof-of-concept, IBM Institute for Business Value, Printed Aug. 27, 2020, 8 pages, https://www.ibm.com/downloads/cas/QYYYV9VK.

Higgins, "IBM Reveals Proof of Concept for Blockchain-Powered Internet of Things," coindesk, Updated Mar. 16, 2015, 7 pages, https://www.coindesk.com/ibm-reveals-proof-concept-blockchain-powered-internet-things.

Khan et al., "Decentralised Internet of Things," Research Gate, Oct. 2019, 19 pages https://www.researchgate.net/publication/336847885.

* cited by examiner

990

Block$_i$

| Header 972$_i$ |
|---|
| - Hash Value of Previous Block<br>- Reference Information |

File(s) (and Metadata) 974$_i$

| Data 1 | REF 1 | Metadata 1 |
| Data 2 | REF 2 | Metadata 2 |
| . | . | . |
| . | . | . |
| . | . | . |
| . | . | . |
| . | . | . |
| Data N | REF N | Metadata N |

Value 976$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 9D

PREDICTIVE DEVICE MAINTENANCE

BACKGROUND

The present disclosure relates to the configuration and management of data processing systems; and more specifically, to the configuration and management of "Internet of Things" (IoT) devices.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

The "Internet of Things" (IoT) is one application of these new technical capabilities. The IoT generally refers to a network of special purpose computing systems e.g., devices, vehicles, signs, buildings, and other objects embedded with electronics, software, sensors, and/or actuators, plus network connectivity, which may enable these systems to collect and exchange data with other IoT devices and/or computer systems. The IoT allows those objects to be sensed or controlled remotely across existing network infrastructure, creating opportunities for more direct integration of the physical world into computer-based systems, and resulting in improved efficiency, accuracy, and economic benefits, in addition to reduced human intervention. When objects in the physical world are augmented with IoT sensors and actuators, the combination becomes an instance of the more general class of cyber-physical systems, also encompassing technologies such as smart grids, virtual power plants, smart homes, intelligent transportation, and smart cities.

In the IoT, sensors/devices/objects of many different types and capabilities may be deployed for many different purposes. Some of these devices may be designed to use a smart phone application (app) to tell a user if maintenance is due or if there is a failure in the associated IoT device. One problem with these systems is that IoT devices commonly use different apps from different vendors, communicate using different protocols/methods, and utilize different interfaces to manage. Further, these IoT devices are often manufactured by many different manufacturers and, as a consequence, have different and quite varied sets of operating characteristics.

Some estimations predict there will be over 50 billion Internet of Things (IoT) devices (i.e., intelligent devices that are able to communicate among themselves) eventually. At some point, the configuration and management of such devices will become too complex for both enterprise and home users.

SUMMARY

According to embodiments of the present disclosure, a computer-implemented method, comprising generating a risk score as a weighted measure of input data about an Internet of Things (IoT) device and a frequency of failure of the IoT device, determining an optimal time to trigger a predictive notification pertaining to the IoT device using the risk score, and at the determined optimal time, issuing the predictive notification. The risk score in some embodiments may indicate an estimate of loss of function of the IoT device.

According to embodiments of the present disclosure, a computer program product for predictive device maintenance. One embodiment of the computer program product may comprise one or more computer readable storage media, and program instructions collectively stored on the one or more computer readable storage media. The program instructions may comprise program instructions to generate a risk score for an Internet of Things (IoT) device as a weighted measure of input data about the IoT device and a frequency of failure of the IoT device, program instructions to adjust the risk score by a weight based on the plurality of customer reviews, program instructions to determine an optimal time to trigger a predictive notification pertaining to the IoT device based on the risk score, and program instructions to issue the predictive notification at the determined optimal time. The input data in some embodiments may comprise documents describing the IoT device and a plurality of customer reviews of the IoT device, and wherein the input data is found from crawling a web and found in libraries. The risk score in some embodiments may indicate an estimate of loss of function of the IoT device.

According to embodiments of the present disclosure, a system for a plurality of Internet of Things (IoT) devices, comprising a processor operably connected to a memory, the memory containing program instructions. The program instructions may, when executed on the processor generate a risk score as a weighted measure of input data about an Internet of Things (IoT) device and a frequency of failure of the IoT device, determine an optimal time to trigger a predictive notification pertaining to the IoT device using the risk score, and at the determined optimal time, issue the predictive notification. The risk score in some embodiments may indicate an estimate of loss of function of the IoT device;

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 9D illustrates a block which may represent the structure of blocks in the blockchain, according to example embodiments.

Figure 1:
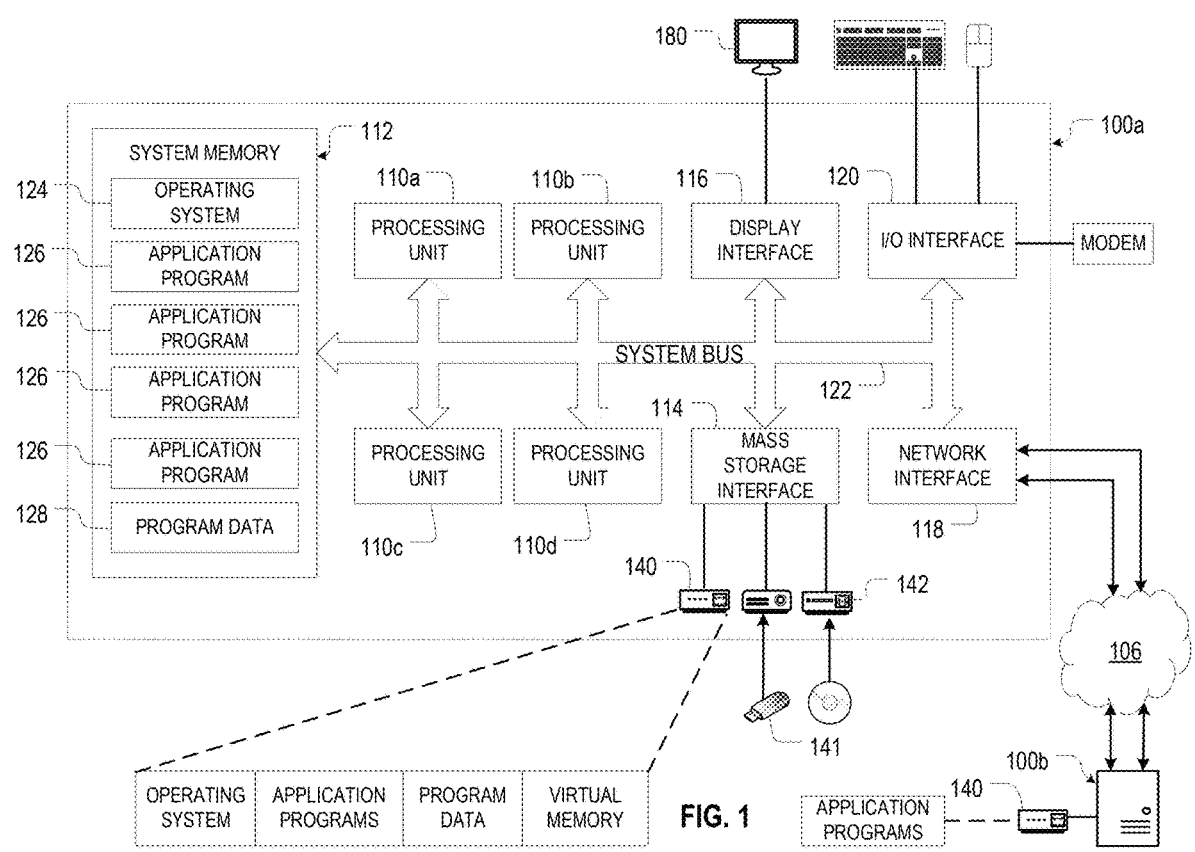
FIG. 1 depicts a data processing system, consistent with some embodiments.

While the invention is amenable to various modifications and alternative forms, specifics thereof have been shown by way of example in the drawings and may be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the configuration and management of data processing systems; more particular aspects relate to the configuration and management of IoT devices. While the present disclosure is not necessarily limited to such applications, various aspects of the disclosure may be appreciated through a discussion of various examples using this context.

The world is currently experiencing a dramatic rise in the number of Internet of Things (IoT) devices used in commercial, industrial, and private environments. Work environments, industrial environments, home environments, public buildings, city streets, etc. are all increasingly equipped with network enabled devices that are able to connect to other devices, receive commands, transmit information, and perform specific functions.

Unfortunately, many users, particularly home users, will not be able to manage all the IoT devices that are (and/or will be) connected to their networks, such as making important security patches, firmware updates, micro updates, and the like. This deficiency can have considerable, real-world impact. For example, a smart thermostat's firmware may expire, which causes both the smart heat and cooling systems to run at the same time. Many home users may not have the technical knowledge skills to both diagnose this problem and update that firmware. Other home users may be technically capable of managing their collection of IoT devices, but may not want to do so, because managing a large number of disparate devices takes considerable time.

Accordingly, some embodiments may manage a collection of IoT devices to maintain a level of reliability, serviceability, and security. Each IoT device in the collection may require maintenance and updates. Some embodiments may include systems that enable collection of data, notifications, auto updates, profiles, and alerts via an IoT dashboard to improve the user experience, and to reduce maintenance cycles for various IoT devices commonly found in various networked ecosystems.

Some embodiments of this disclosure may predict an optimal time to trigger a predictive notification pertaining to a device's state using natural language processing (NLP) with GaussianNB Classifier infused with the device network. Some embodiments may further provide an IoT Data Gathering Dashboard that can tie together a collection IoT devices in a particular networked environment (e.g., connected to a particular home router) and use a blockchain-based, secure environment for device management to collect data from the IoT devices. In this way, some embodiments may save everyone's time, greatly reduce maintenance confusion for the average user, and better organize the typical enterprise user.

Some embodiments may provide for the IoT devices in the system to use a system of unique identifiers. The IoT dashboard in these embodiments may use the unique identifiers to track/manage the IoT devices within a trusted circle of devices (trusted CoD) The IoT dashboard these embodiments may keep track of additions and deletions of IoT devices to the trusted CoD. In one embodiment in operation, once the user receives/purchases the product, the user can take a picture of the product for warranty expiration as a form of maintenance. The system will extract the relevant information from the picture (e.g., manufacturer, model number, serial number, etc.) from the picture and associate the extracted information with the MAC address of the IoT device. The system may then retrieve product information from the manufacturer of that IoT device over the Internet, including current firmware version, using application programming interfaces (API), pub/sub, periodic pull requests, and the like. Additionally or alternatively, some embodiments may utilize a certification system, such as a standards organization, that indicates that the IoT device as compatible with the disclosed system, and thus, an forward all of the relevant information automatically to the IoT dashboard. This may be in the form of a badge, label, or mark indicating the presence of software and/or firmware that links the IoT device to the IoT Dashboard via an application programming interface (API). These embodiments may be desirable because they may require less end user interaction.

The system in some embodiments may retrieve extrinsic information from one or more data stores, such as user reviews available at online seller websites, user comments on message boards, and wikis associated with the product, internal maintenance records for similar products, etc. For ease of searching for product information, some embodiments may provide a method by which official boards can download specific product information directly from the IoT manager (with user permission) so comments can be tagged with specific device model using a hash or other form a Unique ID (UID) that indicates everything up to system board model/version numbers and firmware level. One advantage of these embodiments is that they may enable enthusiasts to order specific replacement parts, as opposed to replacing the whole unit. Another advantage of these embodiments may be that, marrying the UID to manufacturers'/OEMs' own product identifiers (PIDs) may also allow for quicker response and availability of necessary components.

The IoT dashboard may further periodically poll the nearby IoT devices, and return a prompt indicating an operational status of a particular IoT device as working correctly vs. error state and/or is live vs. not live (if a particular IoT device is not checked in as live, the consumer can remove the devices as desired in some embodiments). Some embodiments may use some or all of this retrieved information to make predictive maintenance and/or predictive replacement recommendations in the IoT dashboard.

Some embodiments may further automatically order any required supplies (e.g., filters, batteries, etc.) responsive to the recommendations. Some of these embodiments may store payment information to facilitate those orders.

As an illustrative example of one embodiment in operation, a home user may configure the IoT dashboard to automatically alert them when it is time to change the water filter in their refrigerator, the filter for the HVAC (heating, ventilating, and air conditioning) system, the batteries in the smoke and CO2 alarms etc. Additionally, the inclusion of manufacture APIs may allow embodiment to alert a home user of when a firmware upgrade is required on a blockchain secured device and alert/approval be routed to the home user to manage the maintenance in one/few steps.

As another illustrative example, purchasers of IoT devices may be notified by some embodiments that any product warranties have expired. Some embodiments may further alert their original retailer to contact the consumer via email or the like about the option to extend the various warranties that were added at the time of purchase for extended protection. In addition to this integration of product tracking and purchases, these embodiments may improve customer satisfaction by improving the ability to successfully utilize manufacturer's warranties.

As another illustrative example, durable equipment (e.g., automobiles) manufacturers may offer parts whose warranties expire at different times for different parts. In some embodiments, the IoT dashboard may alert the manufacturer to contact their consumers automatically upon expiration of each successive warranty. Additionally, individual maintenance records for the various parts, firmware, upgrades, etc., found within the 1000s of items needed to build complex equipment could be monitored and maintained. Aggregated consumer data can indicate a potential and particular part failure that is commonly seen across the parts pool in use by the collection of owners/users of a specific product type or specific interchangeable parts across the whole fleet, e.g., the same $O_2$ sensor is used in model X and model Y of some automobile lineup commonly fails at around 45,000 miles or three years.

Data Processing System

FIG. 1 illustrates an embodiment of a data processing system (DPS) 100, consistent with some embodiments. The DPS 100 in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 100, and individual components may have greater complexity than represented in FIG. 3.

The data processing system 100 in FIG. 1 comprises a plurality of central processing units 110 a-110 d (herein generically referred to as a processor 110 or a CPU 110) connected to a memory 112, a mass storage interface 114, a terminal/display interface 116, a network interface 118, and an input/output ("I/O") interface 120 by a system bus 122.

The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100 to communicate with other DPS 100 over the communications medium 106. The memory 112 also contains an operating system 124, a plurality of application programs 126, and program data 128.

Figure 3:
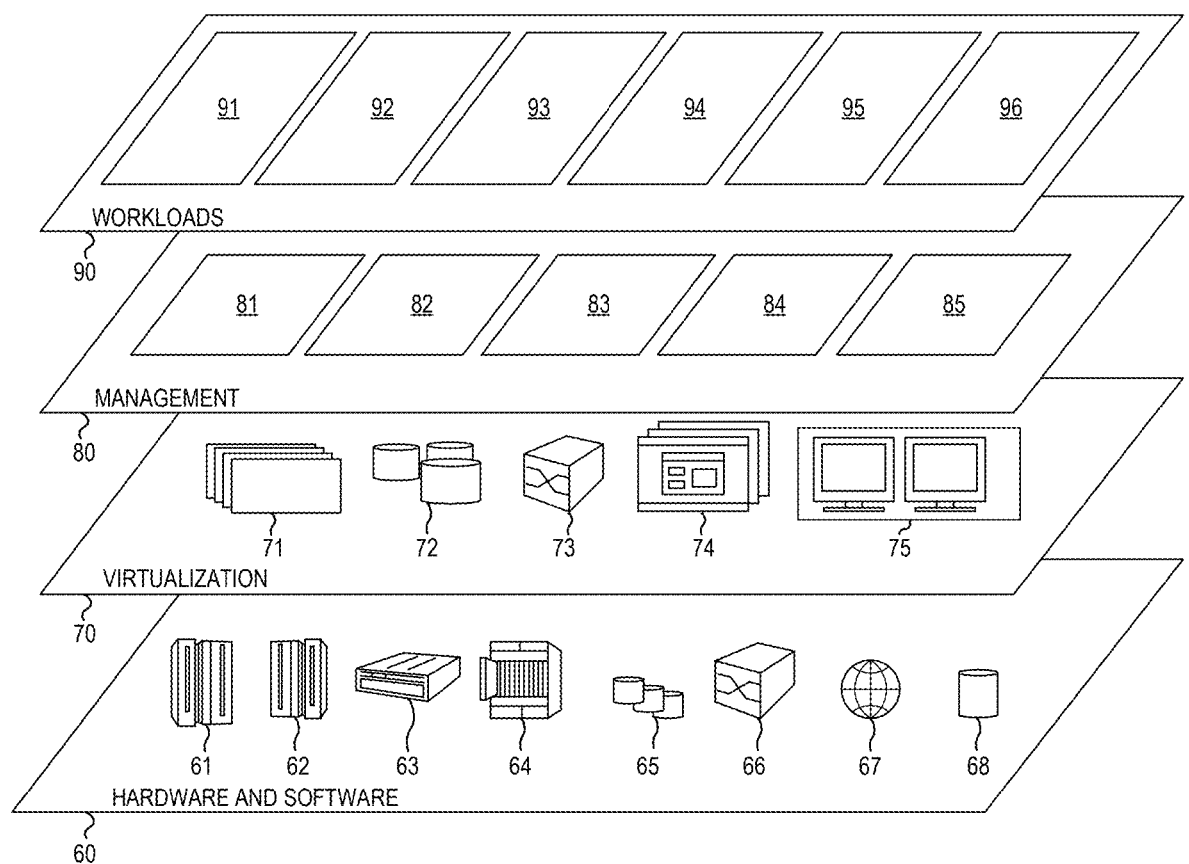
FIG. 3 depicts abstraction model layers, consistent with some embodiments.

The data processing system 100 embodiment in FIG. 3 is a general-purpose computing device. Accordingly, the processors 110 may be any device capable of executing program instructions stored in the memory 112 and may themselves be constructed from one or more microprocessors and/or integrated circuits. In this embodiment, the DPS 100 contains multiple processors and/or processing cores, as is typical of larger, more capable computer systems; however, in other embodiments the computing systems 100 may comprise a single processor system and/or a single processor designed to emulate a multiprocessor system. Further, the processors 110 may be implemented using a number of heterogeneous data processing systems 100 in which a main processor is present with secondary processors on a single chip. As another illustrative example, the processor 110 may be a symmetric multiprocessor system containing multiple processors of the same type.

When the data processing system 100 starts up, the associated processor(s) 110 initially execute the program instructions that make up the operating system 124, which manages the physical and logical resources of the DPS 100. These resources include the memory 112, the mass storage interface 114, the terminal/display interface 116, the network interface 118, and the system bus 122. As with the processor(s) 110, some DPS 100 embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 3, the instructions are stored in a functional form of persistent storage on the direct access storage device 140. These instructions are then loaded into the memory 112 for execution by the processor 110. However, the program code may also be located in a functional form on the computer readable media 142 that is selectively removable and may be loaded onto or transferred to the DPS 100 for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 3 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS 100.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units, such as monitor 180, to the data processing system 100. These display units 180 may be non-intelligent (i.e., dumb) terminals, such as an LED monitor, or may themselves be fully programmable workstations used to allow IT administrators and customers to communicate with the DPS 100. Note, however, that while the display interface 116 is provided to support communication with one or more display units 180, the computer systems 100 does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100. Accordingly, the network interfaces 118 can be any device that facilitates such communication, regardless of whether the network connection is made using present day analog and/or digital techniques or via some networking mechanism of the future. Suitable communication media 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Cloud Computing

Figure 2:
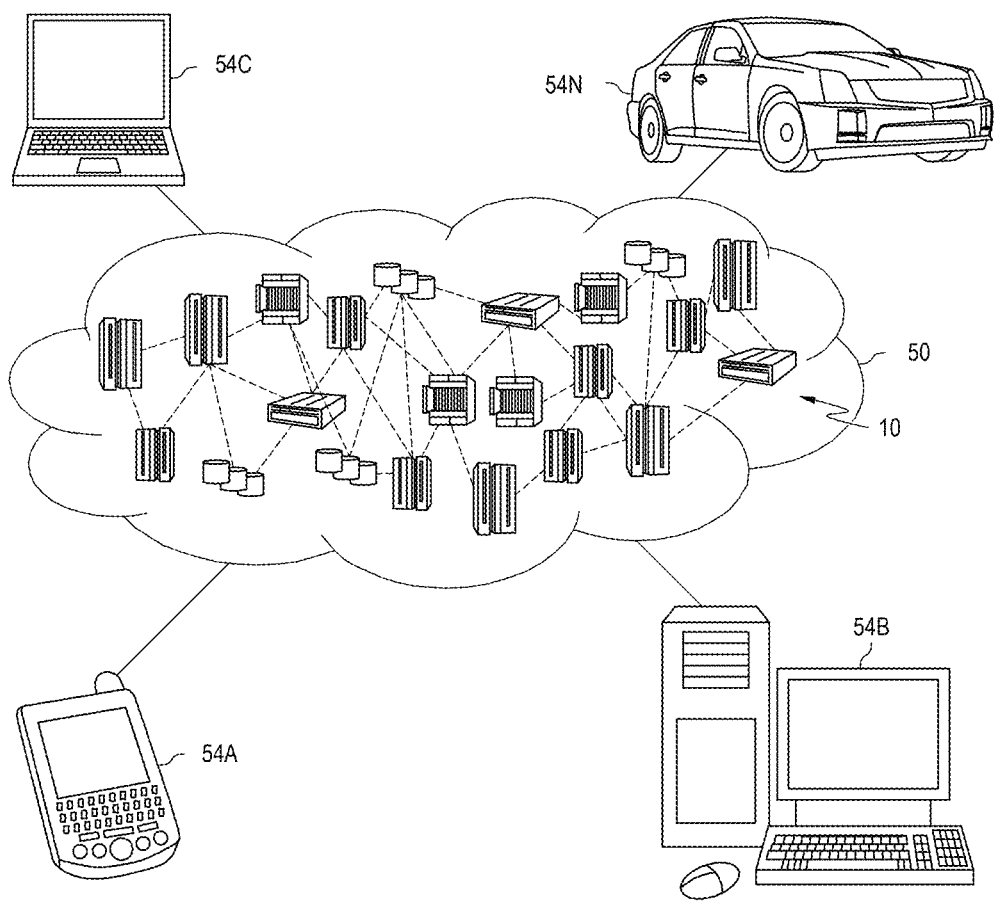
FIG. 2 depicts a cloud computing environment, consistent with some embodiments.

FIG. 2 illustrates a cloud environment containing one or more DPS 100, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an IoT dashboard application 96.

Trusted IoT Circle of Devices

Figure 4:
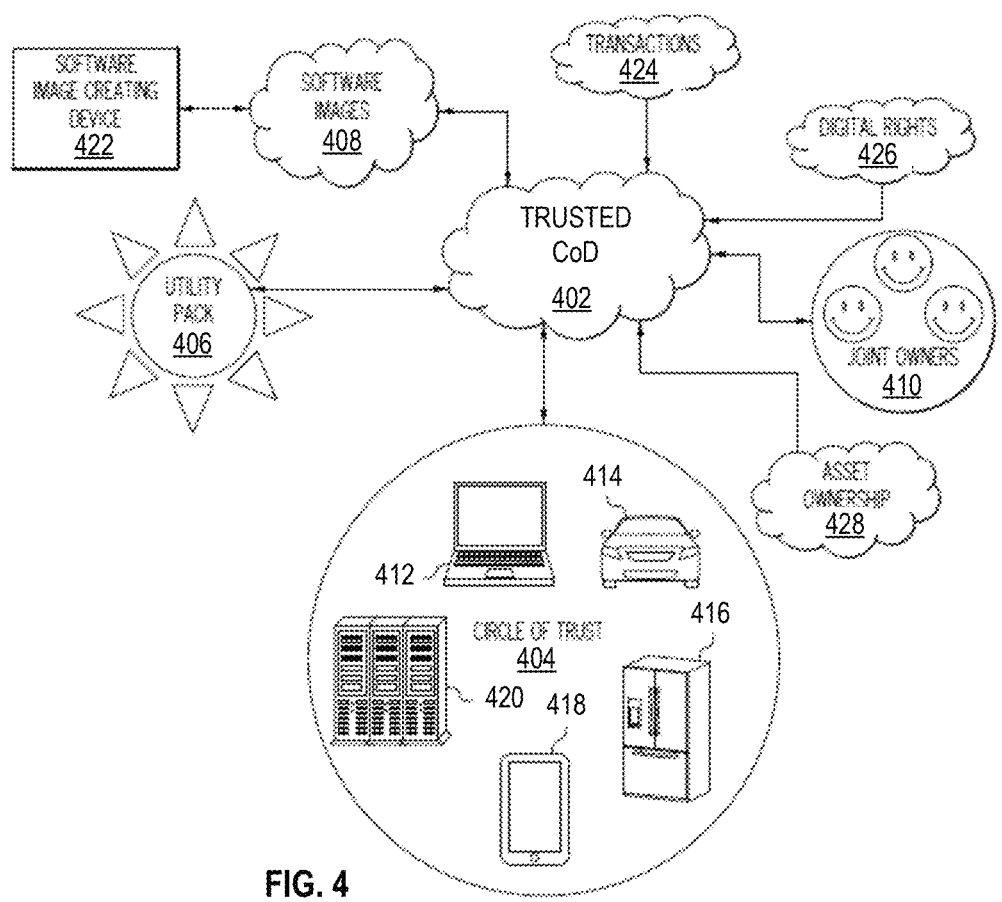
FIG. 4 is a system diagram of a trusted circle of IoT devices (trusted CoD), consistent with some embodiments.

FIG. 4 is a system diagram of a trusted circle of IoT devices (trusted CoD) 402, consistent with some embodiments. The trusted CoD 402 in FIG. 4 may support a circle of trust 404 by exchanging information from a utility pack 406, software images 408, and identities of joint owners 410 with the circle of trust 404. The circle of trust 404, in turn may help a user and/or enterprise seamlessly use all of their IoT devices (e.g., a laptop 412, a communicatively connected vehicle 414, a "smart" appliance 416, a cell phone 418, and/or a server 420) and share data across them.

The utility pack 406 in this embodiment may include utilities (software that maintains and manages trusted CoD 402) as well as metadata related to the software images 408, such as their address/location (e.g., an Internet Protocol—IP address) on a cloud, universal resource locator (URL) addresses, etc. That is, utility pack 406 includes instructions for configuring and deploying trusted CoD 402, as well as how to locate the software/firmware images 408.

The software images 408 in this embodiment may not only include data files about the IoT device, such as model number, serial number, operational state, and current firmware version, but may also include extrinsic information about the IoT device, such as comments from external databases. Software images 408 also includes a history of who/what has accessed the digital files, what changes were made, which IoT device(s) within the circle of trust 404 has been designated as the host peer in the blockchain environment created by the IoT devices within the circle of trust 404, when the digital files were last updated, the version number of the digital files, etc.

Joint owners 410 may define/identify the authorized joint owners of circle of trust 404. That is, joint owners 410 identify a particular person, enterprise, etc., that is authorized to use a particular IoT device from the circle of trust 404 and to share software images with other IoT devices in the circle of trust 404.

The trusted CoD 402 in this embodiment may: 1) act as a "container" for utilities (e.g., including a portable operating system) located in utility pack 406 and software/firmware images 408; 2) reside on a DPS 100 (i.e., a physical computer) or a virtual machine on a DPS 100 (i.e., a software emulation of a physical computer that is able to emulate the functionality of a physical computer system); 3) is portable in such a way that it can manage software/firmware images 408 that are stored on and used by any IoT device from in circle of trust 404; and 4) uses a set of trusted devices as a blockchain mechanism (e.g., peers in a blockchain environment) that enables secure sharing of the utilities and software/firmware images 408 among the IoT devices in circle of trust 404. Thus, the trusted CoD in this embodiment may differ from an Internet-based virtual machine (VM) in that the trusted CoD may use the interconnected IoT devices in the trusted CoD as a blockchain environment and may be operating system agnostic.

The trusted CoD 402 in this embodiment may permit the end-user to have a consistent platform (provided by the portable OS, access to the software/firmware images 408, etc. from the trusted CoD 402) for managing all of his/her IoT devices. This standardization may allow for greater efficiency, labor reductions, and reduced complexity by eliminating the need for the end-user to have to know various OS types to conduct business/personal tasks, and to have to always poll a cloud system whenever a software image is needed. Optionally, in some embodiments, this standardization may be included as part of the badging/certification standard previously described. One advantage of these embodiments is that they may allow for greater homogenization of the IoT ecosystem in the Trusted CoD.

In one or more embodiments, the IoT devices are utilized within the circle of trust 404 as peer devices in a blockchain environment. That is, devices 412-420 shown in FIG. 4 function as peers in a blockchain environment, such that they not only are able to acquire software/firmware images 408 from the trusted CoD 402 and share software images to and from other IoT devices within the circle of trust 404, but also use blockchain technology to protect the software images 408 from being divulged to an unauthorized party.

In some embodiments the trusted CoD 404 provides a blockchain environment that provides a secure environment for implementing aspects disclosed herein. That is, one or more embodiments provide a secure environment in which content can be shared among the IoT devices in the circle of trust 404, which may be physical devices. In one or more of such embodiments, the IoT devices in the circle of trust 404 function as peers in a blockchain.

In some embodiments, strong authentication methodologies may still be used at each endpoint (e.g., information in the utility pack 406, software/firmware images 408, names of joint owners 410, IoT devices 412-420 within the circle of trust 404) to limit potential attack vector. That is, using the blockchain protocol described herein, an attacker is unable to access a software image since that attacker will not also have other information in a blockchain ledger such as an identifier of the trusted CoD 402, the names of the joint owners 410, etc. Cloud security and use of the trusted CoD 402 thus allows data to be centralized such that the data does not need to leave databases (within the cloud of software/firmware images 408) as frequently, because it is virtualized/shared among the IoT devices shown within the trusted CoD 404 when specified by the end-user.

Also in communication with trusted CoD 402 is a record of asset ownership 428 of IoT devices within the circle of trust 404. This record includes identities of particular users who own (or are authorized to use) each of the devices in the circle of trust 404, in order to verify that the particular user is authorized to communicate with the trusted CoD 402, provide content to the circle of trust 404, etc. The records of asset ownership 428 may take on the form of legal documents (e.g., recorded registration of vehicle 414), a lookup table of authorized users/owners of laptop 412, etc. Some embodiments may also provide ownership transfer protocols and safeguards to allow for transfer between two parties, as well as prevent previous users from maintaining access to previously owned equipment.

Figure 5:
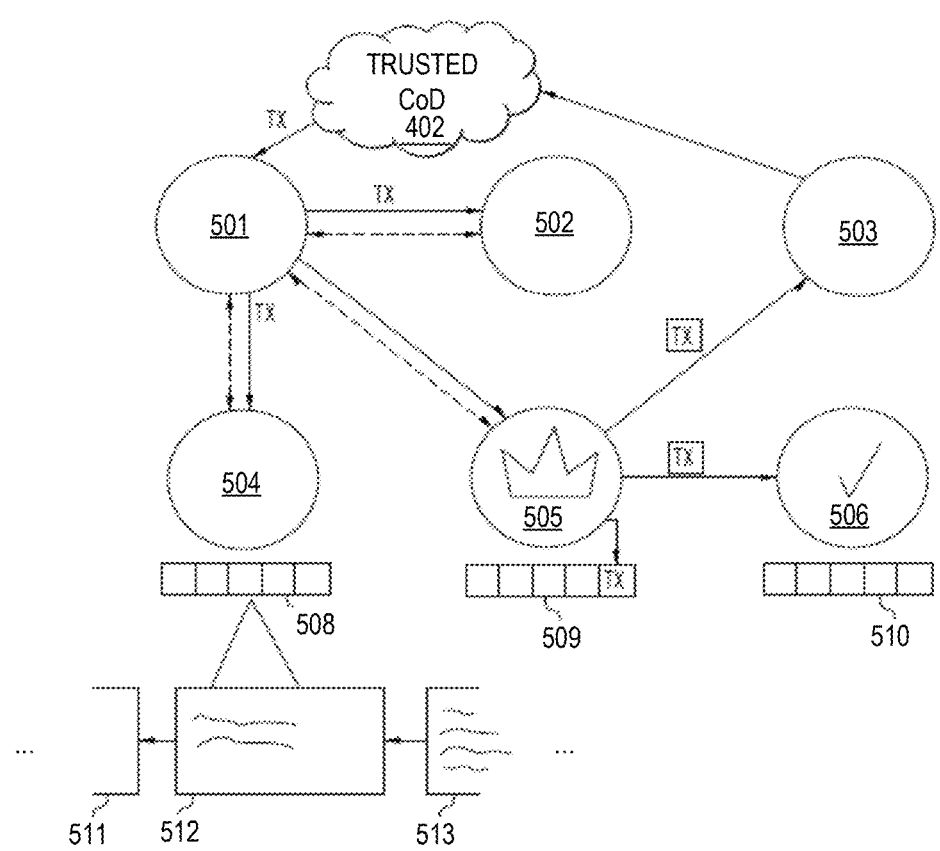
FIG. 5 is an illustration of an exemplary blockchain environment as used in one or more embodiments of the present invention.

With reference now to FIG. 5, an illustration of an exemplary blockchain environment as used in one or more embodiments of the present invention is presented. As shown in FIG. 5, computers 501, 502, 503, 504, 505, and 506 (e.g., blockchain networked set of trusted IoT devices shown in FIG. 4) represent an exemplary peer-to-peer network of devices used to support a peer blockchain environment (in which more or fewer computers/machines form the peer-to-peer network of devices). Each of the computers 501, 502, 503, 504, 505 and 506 (which may be telecommunication devices, portable computers, servers, smart appliances, smart vehicles, cell phones, etc.) in the peer-to-peer network has a same copy of data (e.g., data that represents transaction events), as held in ledgers stored within the depicted blockchains 508, 509, 510 that are associated with respective computers 504, 505, 506.

As shown in FIG. 5, computer 503 (i.e., one of the devices within the circle of trust 204 shown in FIG. 2) sends a transaction Tx (e.g., a new request for a digital file from software images 408, a request to add or delete a device from the circle of trust 404, etc.) to the trusted CoD 202. The trusted CoD 202 then sends the transaction Tx to another device within the circle of trust 204, which is a blockchain environment peer that is depicted as computer 501. Computer 501 then sends the transaction Tx to ledgers known as the depicted blockchains 508, 509, 510 that are associated with other peers, including the depicted computers 502, 504, 505.

Blocks within exemplary blockchain 508 are depicted as block 511, block 512, and block 513. Block 513 is depicted as a newest entry into a ledger held in blockchain 508, and includes not only the newest transactions but also a hash of the data from the older block 512, which includes a hash of the even older block 511. Thus, older blocks are made even more secure each time a new block is created, due to the chaining of hashing operations.

Extrinsic Data Collection

Figure 6:
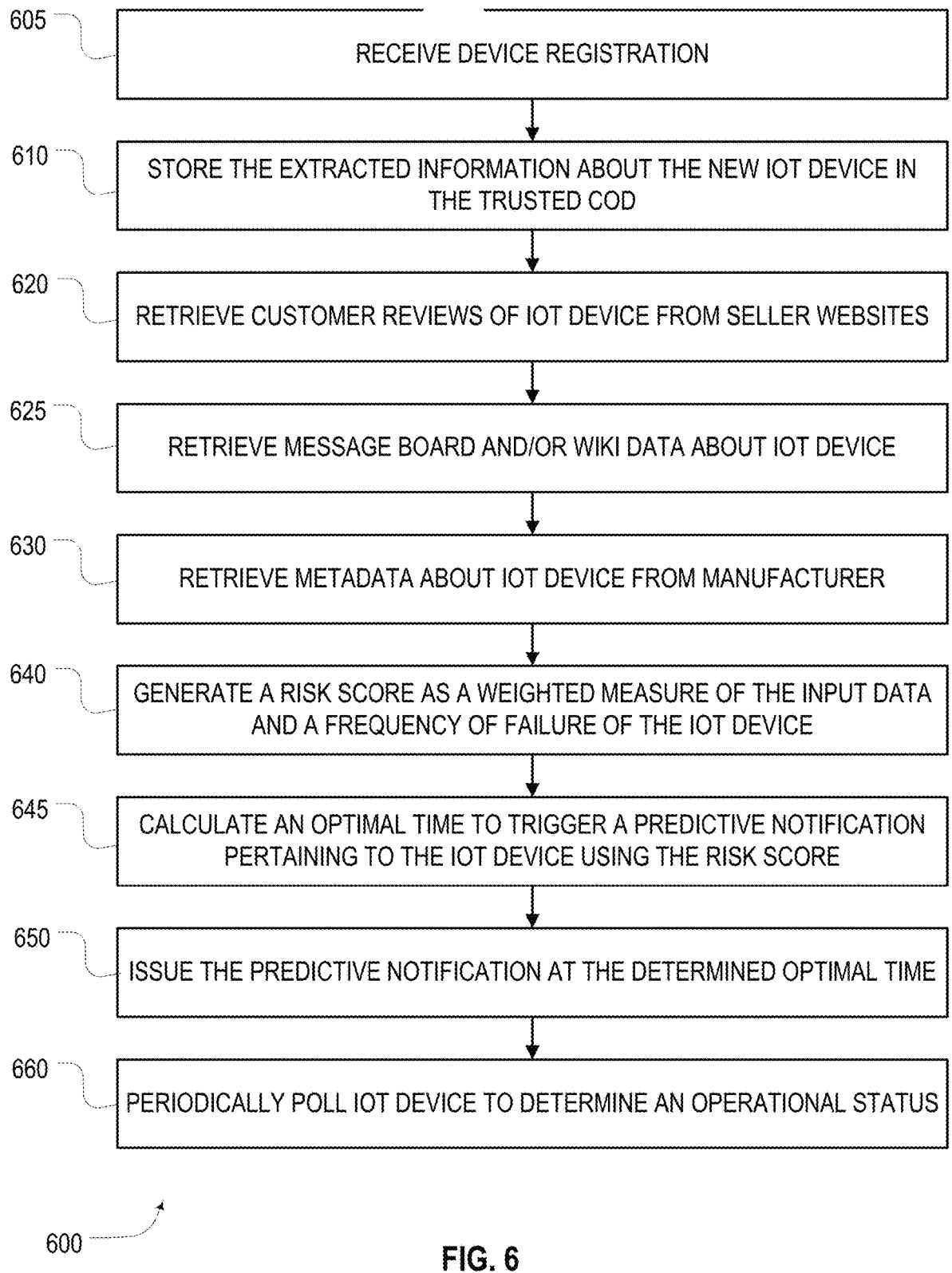
FIG. 6 is a flow chart showing one method 600 of collecting extrinsic data, consistent with some embodiments.

FIG. 6 is a flow chart showing one method 600 of collecting extrinsic data, consistent with some embodiments. At operation 605, a user of the system may first register a new IoT device in a secure environment for device management. In some embodiments, this may include manually entering in a manufacturer name, model number, and serial number in a web page presented to the user by the IoT dashboard 96. In other embodiments, this may include capturing an image of a faceplate of the IoT device using a smart phone or the like, uploading that image to the IoT dashboard 96. The IoT dashboard 96 may then extract the manufacturer name, model number, and serial number from the uploaded image. At operation 610, the IoT dashboard 96 may store the extracted information about the new IoT device in the trusted CoD 402.

In embodiments utilizing the certification system previously described, operation 605 may also include a verification process. The IoT dashboard 96 in these embodiments may confirm that the device is certified and that the appropriate APIs are in place, thus pulling some or all of the registration data from the IoT device upon inception into the ecosystem. Blockchain may further be used in these embodiments to determine and/or confirm that the IoT device is authentic and meets standards for inclusion into the ecosystem. One advantage of these embodiments is that the blockchain may account for and assist with issues arising from theft or improper transfer of ownership for devices purchased second hand, also update Certificates of Ownership/Authenticity upon repair or replacement of specific devices.

At operation 620, the IoT dashboard 96 may begin retrieving data about the new IoT device using the extracted information, which may be input into a reinforcement learning model described in more detail below. This input data may comprise plurality of documents describing the IoT device. In some embodiments, this may include crawling one or more web sites, such as an internet retailer, containing consumer/purchaser reviews of the IoT device. In some embodiments, this may additionally or alternatively include crawling one or more message boards and wikis information associated with the IoT device. At operation 625, the IoT dashboard 96 may retrieve internal maintenance records for similar IoT devices owned by the user, if any. This may include querying a database (not shown) coupled to the IoT dashboard 96 containing the registration and retirement dates for each IoT device sharing the same manufacturer and/or model number, as well as any maintenance performed on those IoT devices.

At operation 630, the IoT dashboard may then automatically retrieve metadata about the IoT device from its manufacturer. This may include using application programming interfaces (API) to retrieve the current firmware version of the IoT device, the manufacturer's recommended maintenance schedule, part numbers/identifiers for any replaceable parts, such as filters, fluids, kits, etc. This may also include registering the IoT device with the manufacturer to comply with warrantee requirements (if any) and subscribing to any relevant update services (pub/sub). Operation 630 may also include the collection of unique information from the IoT device itself, such as a serial code indicating which models and revisions of system boards and system board configurations are used, as this information may have an effect on probable failure rates and may allow for more detailed troubleshooting. One advantage of these embodiments is that they may also enable manufacturers to better identify and alert for replacement of defective internal components, as two identical model numbers may not always use the same internal hardware configuration.

At operation 640, the IoT dashboard 96 may generate a generate a risk score as a weighted measure of the input data and a frequency of failure of the IoT device. The risk score may indicate an estimate of loss of function of the IoT device. As will be discussed in more detail below, this may include using natural language processing (NLP) with a GaussianNB Classifier to parse the plurality of documents retrieved at operations 620, 626, and 630.

As an illustrative example, suppose users began to experience sudden failure of system boards over a short period of time after purchase of a particular type of IoT device, and began flooding public forums with comments to this effect. These comments may be used as input to the risk score measure. The manufacturer in this illustrative example may initially respond by issuing an advisory that certain models of the IoT device were prematurely failing, and offered motherboard replacement to affected owners within the warranty period. This advisory may be used as another input.

Continuing the illustrative example, the manufacturer may eventually trace the failures to an error at one of its supplier's factories that caused the manufacture of defective components, which were installed on specific motherboards by the manufacturer and which resulted in short term failure of the IoT device. The manufacturer may respond by recalling any IoT devices that have the specific motherboard, regardless of warranty status. This recall may be yet another input.

The comments, advisories, and recalls may be weighed in this illustrative example based on source to establish an overall score. For comments, some embodiments may consider how many comments, etc., were posted, over what period of time, and if those comments applied to the specific hardware configuration of the device in question, and what the result of those comments was. A specification by the thread originator (OP) as to the disposition of the IoT device may also help determine the overall score for the thread, then an aggregate can be built based on similar experiences. For advisories and recalls, the manufacturers in some embodiments may issue static scores, which may be weighed against the specific configuration of the IoT device.

Continuing the illustrative example, some embodiments may further use anonymized data from other IoT dashboards 96 to determine the risk score based on aggregate failure rate; which may also be factored into the overall score. This anonymized data may be shared in some embodiments using the blockchain to ensure accuracy.

The overall risk score may be calculated from various inputs in this illustrative example. In some embodiments, user comments and review data may have the least weight/bearing on the overall risk score, but increase based on overall aggregate derived from numbers of comments, while also gathering information from other IoT dashboards sharing anonymized data referencing identical or highly similar products/configurations. The higher the overall risk score based on the inputs, the greater the chance the device will fail, or may already be in a failure (in the case of recall) state.

Returning to FIG. 6, the IoT dashboard 96 may calculate an optimal time to trigger a predictive notification pertaining to the IoT device using the risk score at operation 645. This predictive notification may include notifications of required maintenance, such as to changing a filter on the IoT device. Additionally or alternatively, some embodiments may automatically order the required part(s) using previously stored payment information and preferences. This predictive notification may also include status information about the IoT device, such as an indication that a warrantee or service contract related to the IoT device is about to expire.

At operation 650, the IoT dashboard 96 may issue the predictive notification at the determined optimal time. In some embodiments, this may further include aggregating one or more predictive notifications in a dashboard. At 660, the IoT dashboard 96 may periodically poll IoT device and/or nearby IoT devices to determine an operational status. This may include determining if the IoT device is working correctly or in error state. This may additionally or alternatively include determining if the IoT device is live or not live. In the latter two cases e.g., if a particular IoT device is not checked in as live, the user may be given the option to remove that IoT device from the IoT dashboard 96 in some embodiments).

Extrinsic Data Analysis

Some embodiments may retrieve extrinsic information from one or more data stores, such as user reviews available at online seller websites, user comments on message boards, and wikis associated with the product, internal maintenance records for similar products, etc. These embodiments may use that information to help predict an optimal time to perform predictive maintenance and/or to replace parts. Some embodiments may deploy a natural language processing (NLP) model, including Latent Dirichlet Allocation (LDA) to classify text in a document to a particular topic and Naive Bayes Classifier to calculate an optimal time to trigger the notification to poll the device in a predictive fashion based on device's attributes stored in the IoT dashboard 96. The models may be trained using reinforcement learning techniques.

More specifically, some embodiments may deploy a optical character recognition (OCR) software to initially pull the manufacturer name, serial number, and model number from the captured image. Some embodiment may then use topical web crawling/key-loggers to collect a corpus of information related to the captured identifiers. This may include user reviews available at online seller websites, user comments on message boards, and wikis associated with the product, internal maintenance records for similar products, etc.

Because the corpus in some applications may include unstructured information, some embodiments may then infuse a NLP classifier and LDA (topic categorization) to validate specific product traits, and customer reviews pertaining to a given product, to calculate an optimal time would be to renew a warranty or the like. Illustratively, this may include calculating and updating a risk score from the corpus using the pseudo-code algorithm in Table 1 below:

TABLE 1

```
# Importing the libraries
    import numpy as np
    import matplotlib.pyplot as plt
    import pandas as pd
# Importing the dataset
    dataset = pd.read_csv('Device_Reviews.tsv', delimiter = '\t') #reviews from
    website
# Cleaning the texts
    import re
    import nltk
    nltk.download('stopwords')
    from nltk.corpus import stopwords
    from nltk.stem.porter import PorterStemmer
    corpus = [ ]
    for i in range(0, 1000):
        review = re.sub('[^a-zA-Z]', ' ', dataset['Review'][i])
        review = review.lower( )
        review = review.split( )
        ps = PorterStemmer( )
        review = [ps.stem(word) for word in review if not word in
        set(stopwords.words('english'))]
        review = ' '.join(review)
        corpus.append(review)
#Run LDA using TF-IDF for topic modeling and extracting the features from the
document relevant to: [device ID, warranty expiration, reviews, purchase_time,
review_time]
    lda_model_tfidf = gensim.models.LdaMulticore(corpus_tfidf, num_topics=5,
    id2word=dictionary, passes=2, workers=4)
    for idx, topic in lda_model_tfidf.print_topics(-1):
        print('Topic: { } Word: { }'.format(idx, topic))
# Creating the Bag of Words model
    from sklearn.feature_extraction.text import CountVectorizer
    cv = CountVectorizer(max_features = 15)
    X = cv.fit_transform(corpus).toarray( )
    y = dataset.iloc[:, 1].values
# Splitting the dataset into the Training set and Test set
    from sklearn.model_selection import train_test_split
    X_train, X_test, y_train, y_test = train_test_split(X, y, test_size = 0.20,
    random_state = 0)
# Fitting Naive Bayes to the Training set
    from sklearn.naive_bayes import GaussianNB
    classifier = GaussianNB( )
    classifier.fit(X_train, y_train)
```

TABLE 1-continued

Predicting the Test set results
  y_pred = classifier.predict(X_test)
If K * softmax(y_pred) (review score) < diff_t but > r_th configured by the user based on
poling frequency, where K = review_time − purchase time, then;
optimal time = K * softmax(y_pred) (review score) wherein
where diff_t = difference from warranty time and time of posting the complaints for
respective device where numpy is an open source programming library adding support for large, multi-dimensional arrays and matrices, matplotlib is an open source programming library for plotting, pandas is an open source programming library with support for data manipulation and analysis, and NTLK is an open source programming library for natural language processing. The stop words in this illustrative example generally refer to articles and prepositions in natural language, which may be removed without fundamentally changing the topic of the underlying text. The LDA analysis in this illustrative example classifies the cleaned up comments, and may build a topic per document and words per topic models. A Bag of Words model may then be used generate a sentiment from the LDA output by computing various measures or characterizations of input text, such as a frequency of use of a term. Each measure or characterization, in turn, may have a singular or multi-response associated with it, which may be associated with hidden topics or categories. That is, many data sources (e.g., an online forum) may have a set topic. In these sources, it can be expected to see a collection of common or expected words represented consistently by the population participating in that conversation. Because LDA analysis is topic modeling, it may be used to examine a collection of words themselves. Once LDA analysis is applied to data source, then the bag of words model may be used to identify the hidden topics and/or categories.

The resulting data set may be split into a training set and test set. The training set may be used to train a Naive Bayes model, which will be used to calculate an initial risk score for a failure mode of the IoT device and/or components thereof. The test set, in turn, may be used to update the initial risk score. One feature and advantage of this embodiment is that the risk score may computed as a weighted measure of above inputs and frequency of failure/anomaly/aberrations in the normal functionality of the device, along with a weight to the customer reviews to get an added estimate of the LOF (loss of function) of the device to trigger an alert at the right time.

Similar comments may then be clustered in some embodiments based on Euclidian distance using a k-nearest neighbors (KNN) model and Watson® sentiment analysis may be used in order to determine a positive or negative scoring on the weight associated with inputs pertaining to social media comments. The system in these embodiments may generate the output an aggregation of data to determine average and actual maintenance and/or replacement time frames, etc., as well as provide reminders to end users for maintenance. Similarly, manufacturers could use the data for production and quality control.

In another embodiment, a Bidirectional Encoder Representations from Transformers (BERT) model may be used to extract the start and stop end span from the paragraph, or a Kaggle dataset of reviews pertaining to a device model and using with LDA for specific topics, may be used in place of the Bag of Words model. The start/end token these alternate embodiments may use the time of purchase information as proxy the respective timestamp for the sentiment score associated with the comment, which in turn, may feed into the classifier to generate a score indicating the optimal normalized time to notify the user for verifying the device. These alternate embodiments may perform better due to higher accuracy in in paragraph feature extraction and time computation as the features scale.

Blockchain Architecture

Figure 7A:
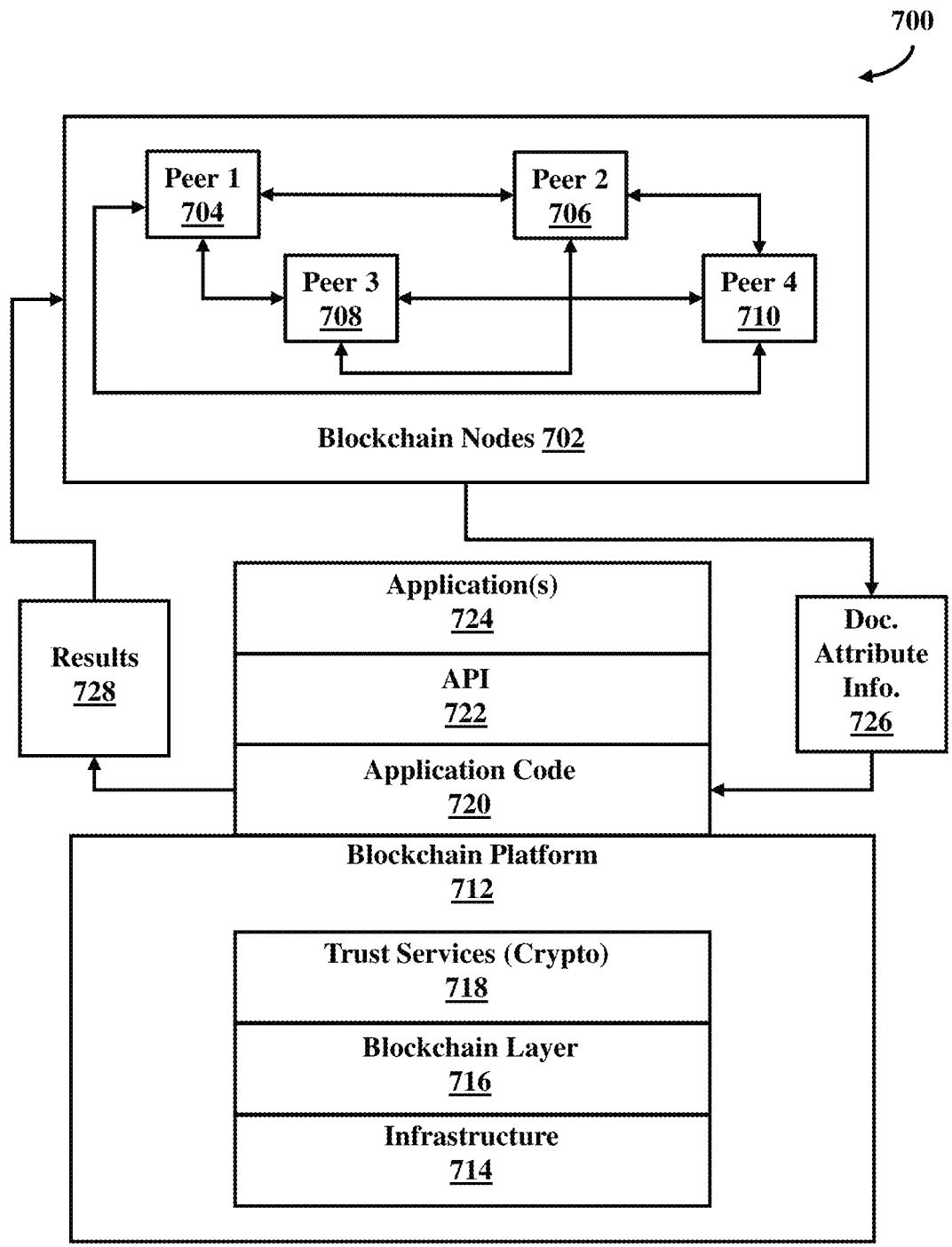
FIG. 7A depicts an example blockchain architecture configuration, consistent with some embodiments.

FIG. 7A illustrates a blockchain architecture configuration 700, consistent with some embodiments. The blockchain architecture 700 in these embodiments may include certain blockchain elements, for example, a group of blockchain nodes 702. The group of blockchain nodes 702, in turn, may include one or more member nodes 704-710 (these four nodes are depicted by example only). These member nodes 704-710 may participate in a number of activities, such as blockchain transaction addition and validation process (consensus). One or more of the member nodes 704-710 may endorse transactions based on endorsement policy and may provide an ordering service for all blockchain nodes in the architecture 700. A member node 704-710 may initiate a blockchain authentication and seek to write to a blockchain immutable ledger stored in blockchain layer 716, a copy of which may also be stored on the underpinning physical infrastructure 714.

The blockchain architecture 700 in some embodiments may include one or more applications 724, which are linked to application programming interfaces (APIs) 722 to access and execute stored program/application code 720 (e.g., chaincode, smart contracts, etc.). The stored program/application code 720, in turn, can be created according to a customized configuration sought by participants and can maintain its own state, control their own assets, and receive external information. The stored program/application code 720 can be deployed as a transaction and installed, via appending to the distributed ledger, on all blockchain nodes 704-710.

A blockchain base or platform 712 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 716 may expose an interface that provides access to the virtual execution environment necessary to process the program code and engage a physical infrastructure 714. Cryptographic trust services 718 may be used to verify transactions such as asset exchange transactions and keep information private.

The blockchain architecture configuration of FIG. 7A may process and execute the program/application code 720 via one or more interfaces exposed, and services provided, by the blockchain platform 712. The program/application code 720 may control blockchain assets. For example, the code 720 can store and transfer data, and may be executed by member nodes 704-710 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 726 may be processed by one or more processing entities (e.g., virtual machines) included in the blockchain layer 716. A result 728 may include a plurality of linked shared documents. The physical infrastructure 714 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code, in some embodiments, may be used to create a temporary data structure in a virtual machine or other computing platforms. Data written to the blockchain in these embodiments may be public or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by the use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 7B:
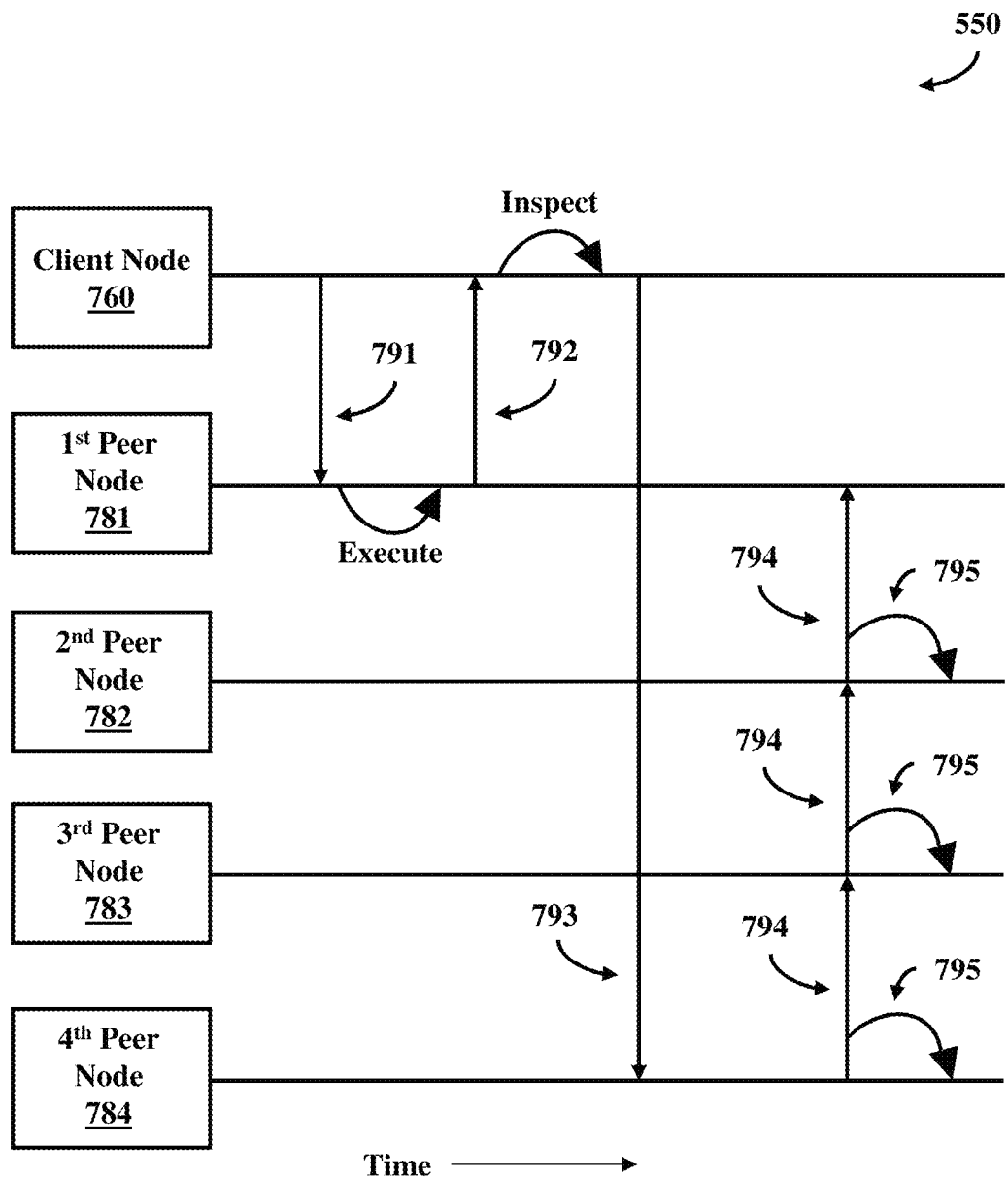
FIG. 7B illustrates a blockchain transactional flow, consistent with some embodiments.

FIG. 7B illustrates an example of a blockchain transactional flow 750 between nodes of the blockchain in accordance with some embodiments. The transaction flow in these embodiments may include a transaction proposal 791 sent by an application client node 760 to an endorsing peer node 781. The endorsing peer 781 may verify the client signature and execute a chaincode function to initiate the transaction. The output may include the chaincode results, a set of key/value versions that were read in the chaincode (read set), and the set of keys/values that were written in chaincode (write set). The proposal response 792 may then be sent back to the client 760, along with an endorsement signature, if approved.

In response, the client 760 may assemble the endorsements into a transaction payload 793 and broadcasts it to an ordering service node 784. The ordering service node 784 may then deliver ordered transactions as blocks to all peers 781-783 on a channel. Before committal to the blockchain, each peer 781-783 may validate the transaction. For example, the peers in some embodiments may check the endorsement policy to ensure that the correct allotment of the specified peers have signed the results and authenticated the signatures against the transaction payload 793.

With continuing reference to FIG. 7B, the client node 760 in some embodiments may initiate the transaction 791 by constructing and sending a request to the peer node 781, which may act an endorser. The client 760 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 781 may verify: (a) that the transaction proposal is well-formed; (b) the transaction has not been submitted already in the past (replay-attack protection); (c) the signature is valid; and (d) that the submitter (client 760, in this example embodiment) is properly authorized to perform the proposed operation on that channel. The endorsing peer node 781 may take the transaction proposal inputs as arguments to the invoked chaincode function. The chaincode may then be executed against a current state database to produce transaction results, including a response value, read set, and write set. In some embodiments, no updates are made to the ledger at this point. Instead, the set of values, along with the endorsing peer node's 781 signature, may be passed back as a proposal response 792 to the SDK of the client 760, which parses the payload for the application to consume.

In response, the application of the client 760 may inspect/verify the endorsing peers' signatures and may compare the proposal responses to determine if the proposal response is the same. If the chaincode only queried the ledger, the application may inspect the query response and would typically not submit the transaction to the ordering service 784. If the client application intends to submit the transaction to the ordering service 784 to update the ledger, the application may determine if the specified endorsement policy has been fulfilled before submitting (i.e., did all peer nodes necessary for the transaction endorse the transaction). Here, the client may include only one of a multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After a successful inspection, in operation 794, the client 760 may assemble endorsements into a transaction and may broadcast the transaction proposal and response within a transaction message to the ordering service 784. The transaction may contain the read/write sets, the endorsing peers' signatures, and a channel ID. The ordering service 784 does not need to inspect the entire content of a transaction in order to perform its operation; instead the ordering service 784 may simply receive transactions from all channels in the network, order them chronologically by channel, and create blocks of transactions per channel.

The blocks of the transaction may be delivered from the ordering service 784 to all peer nodes 781-783 on the channel. The transactions 794 within the block may be validated to ensure any endorsement policy is fulfilled and to ensure that there have been no changes to ledger state for read set variables since the read set was generated by the transaction execution. Transactions in the block may be tagged as being valid or invalid. Furthermore, in operation 795, each peer node 781-783 may append the block to the channel's chain, and for each valid transaction, the write sets are committed to the current state database. An event may be emitted to notify the client application that the transaction (invocation) has been immutably appended to the chain, as well as to notify whether the transaction was validated or invalidated.

Permissioned Blockchains

Figure 8A:
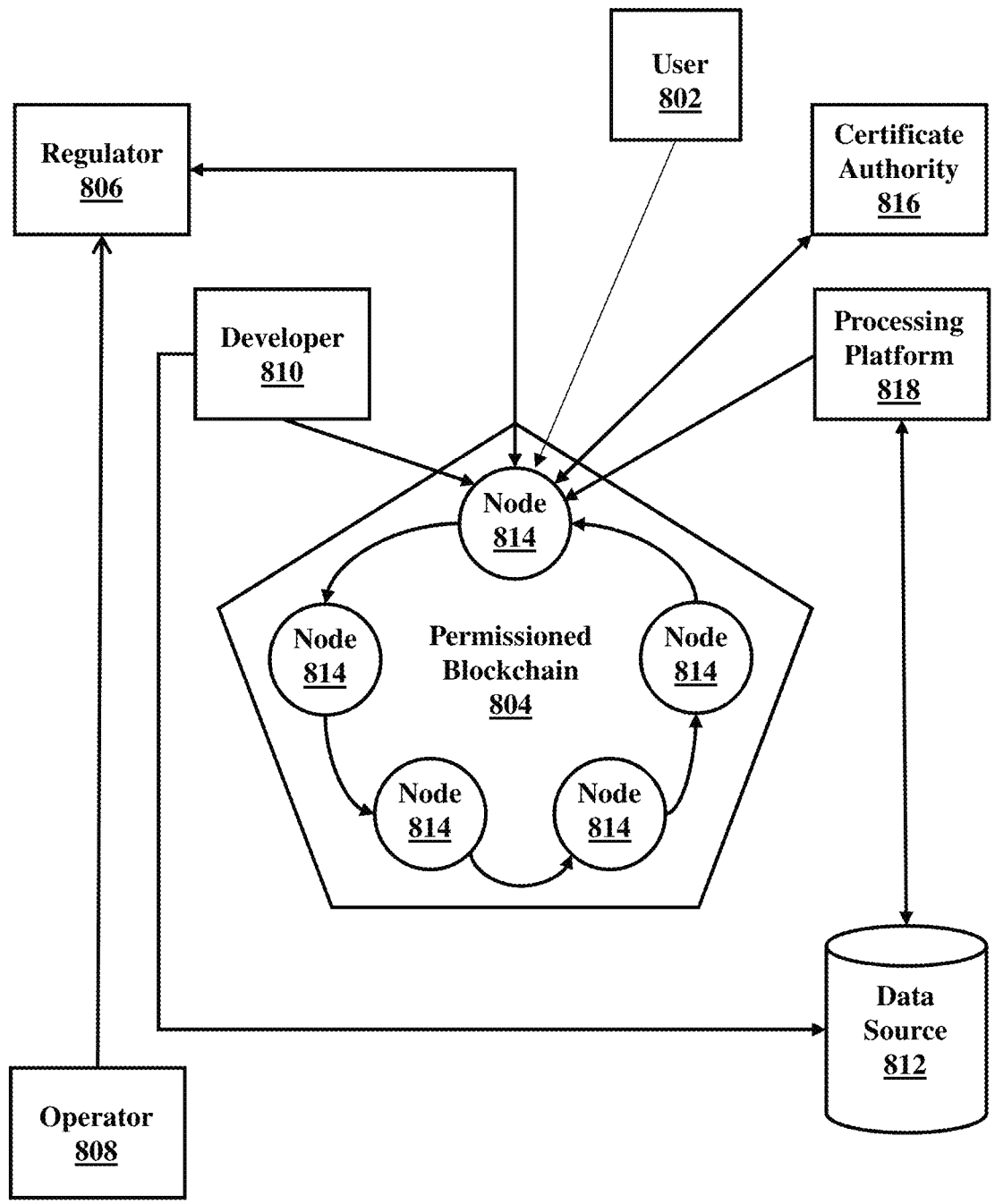
FIG. 8A illustrates a flow diagram, consistent with some embodiments.

FIG. 8A illustrates an example of a permissioned blockchain network, which features a distributed, decentralized peer-to-peer architecture, consistent with some embodiments. In this example, a blockchain user 802 may initiate a transaction to the permissioned blockchain 804. In this example, the transaction may be a deploy, invoke, or query, and may be issued through a client-side application leveraging an SDK, directly through an API, etc. Networks may provide access to a regulator 806, such as an auditor. A blockchain network operator 808 manages member permissions, such as enrolling the regulator 806 as an "auditor" and the blockchain user 802 as a "client." An auditor may be restricted only to querying the ledger, whereas a client may be authorized to deploy, invoke, and query certain types of chaincode.

A blockchain developer 810 can write chaincode and client-side applications in some embodiments. The blockchain developer 810 in these embodiments may deploy chaincode directly to the network through an interface. To include credentials from a traditional data source 812 in chaincode, the developer 810 may use an out-of-band connection to access the data. In this example, the blockchain user 802 may connect to the permissioned blockchain 804 through a peer node 814. Before proceeding with any transactions, the peer node 814 may retrieve the user's enrollment and transaction certificates from a certificate authority 816, which manages user roles and permissions. In some embodiments, blockchain users must possess these digital certificates in order to transact on the permissioned blockchain 804. In other embodiments, blockchain users may be authenticated using other techniques, such as via distributed chains of trust. Meanwhile, a user attempting to utilize chaincode may be required to verify their credentials on the traditional data source 812. Chaincode may use an out-of-band connection to this data through a traditional processing platform 818 to confirm the user's authorization.

Figure 8B:
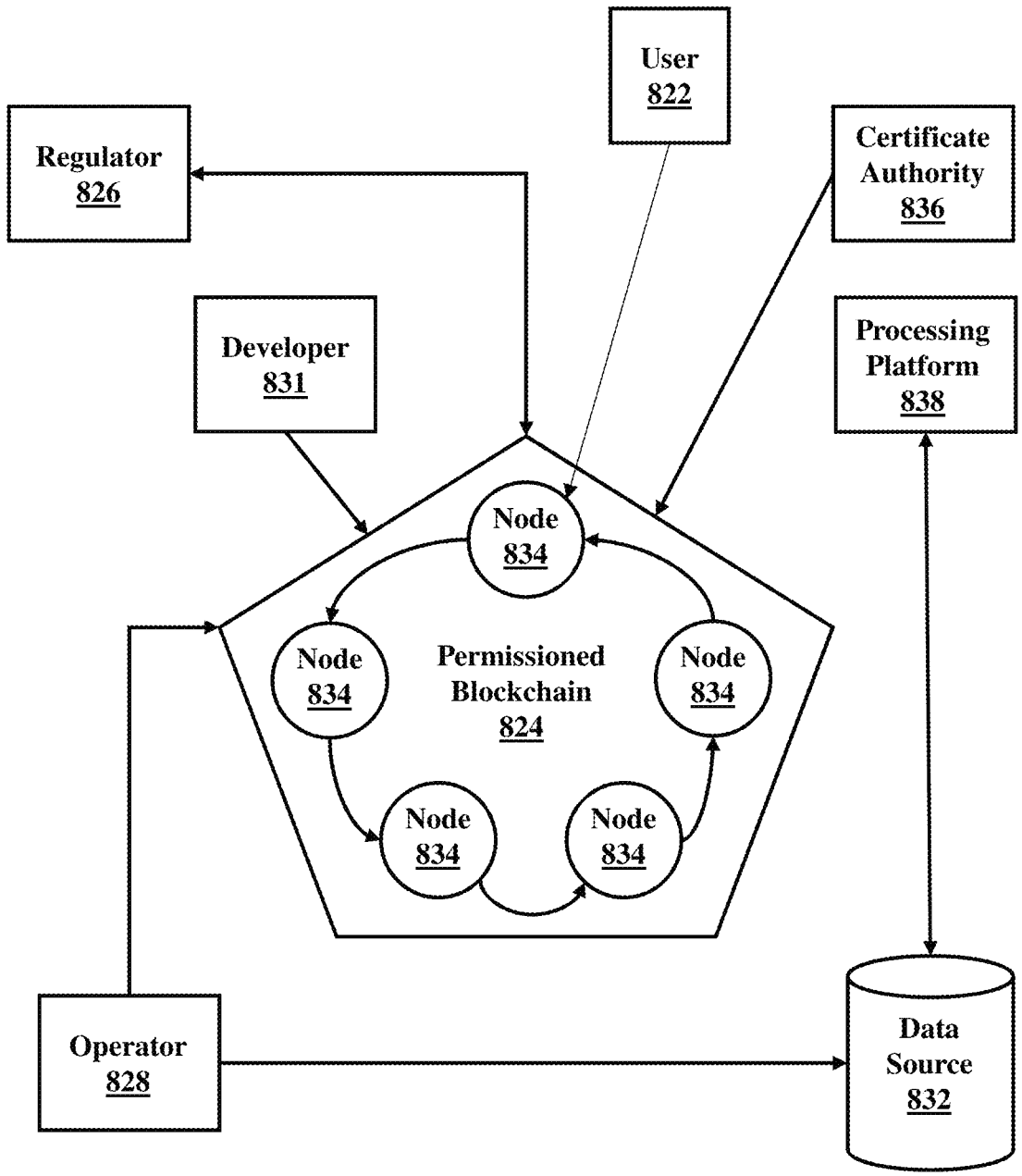
FIG. 8B illustrates a further flow diagram, consistent with some embodiments.

FIG. 8B illustrates another example of a permissioned blockchain network, which features a distributed, decentralized peer-to-peer architecture, consistent with some embodiments. In this example, a blockchain user 822 may submit a transaction to the permissioned blockchain 824. In this example, the transaction can be a deploy, invoke, or query, and may be issued through a client-side application leveraging an SDK, directly through an API, etc. Networks may provide access to a regulator 826, such as an auditor. A blockchain network operator 828 manages member permissions, such as enrolling the regulator 826 as an "auditor" and the blockchain user 822 as a "client." An auditor could be restricted only to querying the ledger, whereas a client could be authorized to deploy, invoke, and query certain types of chaincode.

A blockchain developer 831 in these embodiments may write chaincode and client-side applications. The blockchain developer 831 may deploy chaincode directly to the network through an interface. To include credentials from a traditional data source 832 in chaincode, the developer 831 may use an out-of-band connection to access the data. In this example, the blockchain user 822 connects to the network through a peer node 834. Before proceeding with any transactions, the peer node 834 retrieves the user's enrollment and transaction certificates from the certificate authority 836. In some embodiments, blockchain users must possess these digital certificates in order to transact on the permissioned blockchain 824. In other embodiments, blockchain users may be authenticated using other techniques, such as via distributed chains of trust. Meanwhile, a user attempting to utilize chaincode may be required to verify their credentials on the traditional data source 832. Chaincode can use an out-of-band connection to this data through a traditional processing platform 838 to confirm the user's authorization.

Figure 8C:
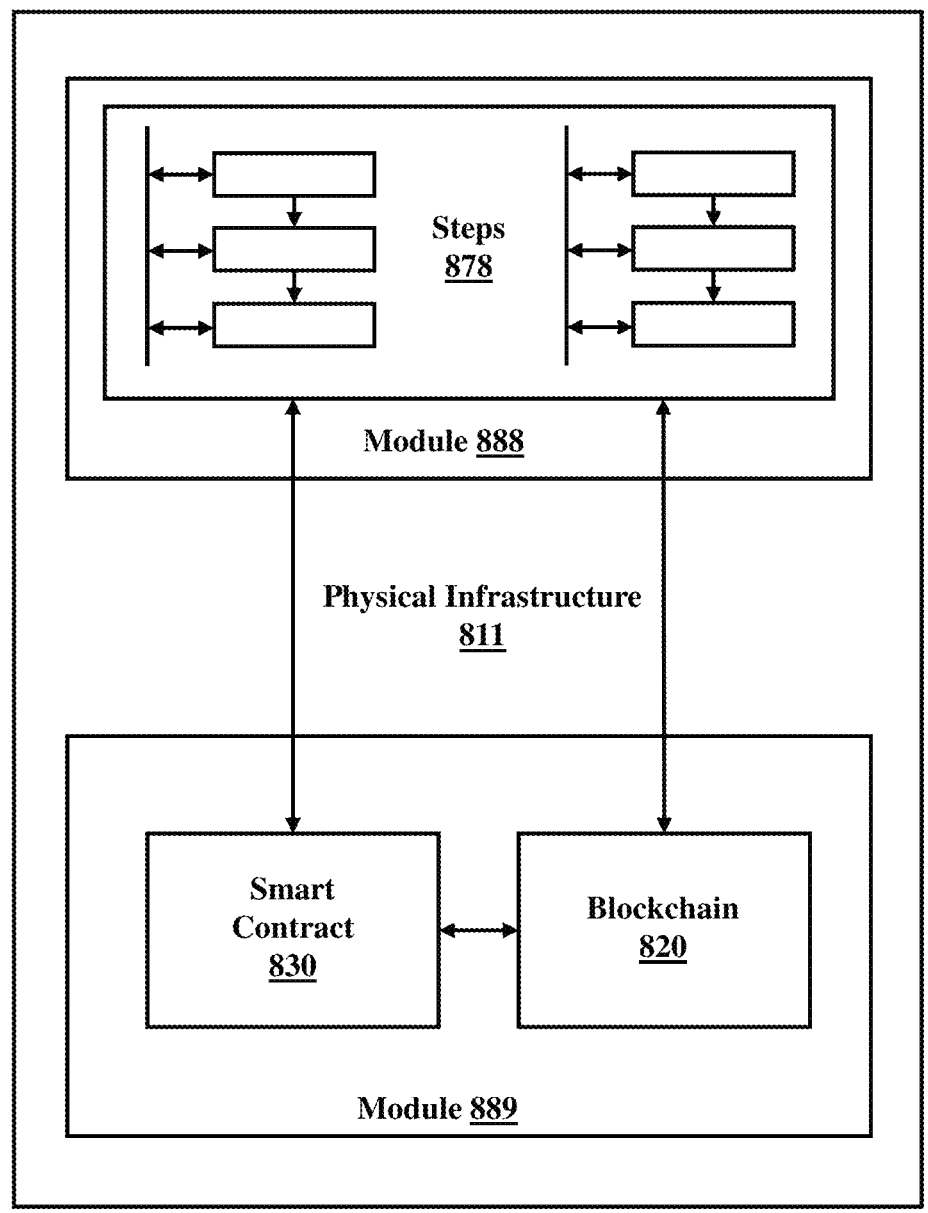
FIG. 8C illustrates an example system configured to perform one or more operations described herein, consistent with some embodiments.

FIG. 8C illustrates an example system that includes a physical infrastructure 811 configured to perform various operations, consistent with some embodiments. Referring to FIG. 6C, the physical infrastructure 811 includes a module 888 and a module 889. The module 819 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical infrastructure 811, the module 888, and the module 889 may include one or more computers, servers, processors, memories, and/or wireless communication devices. Further, the module 888 and the module 889 may be the same module.

Figure 8D:
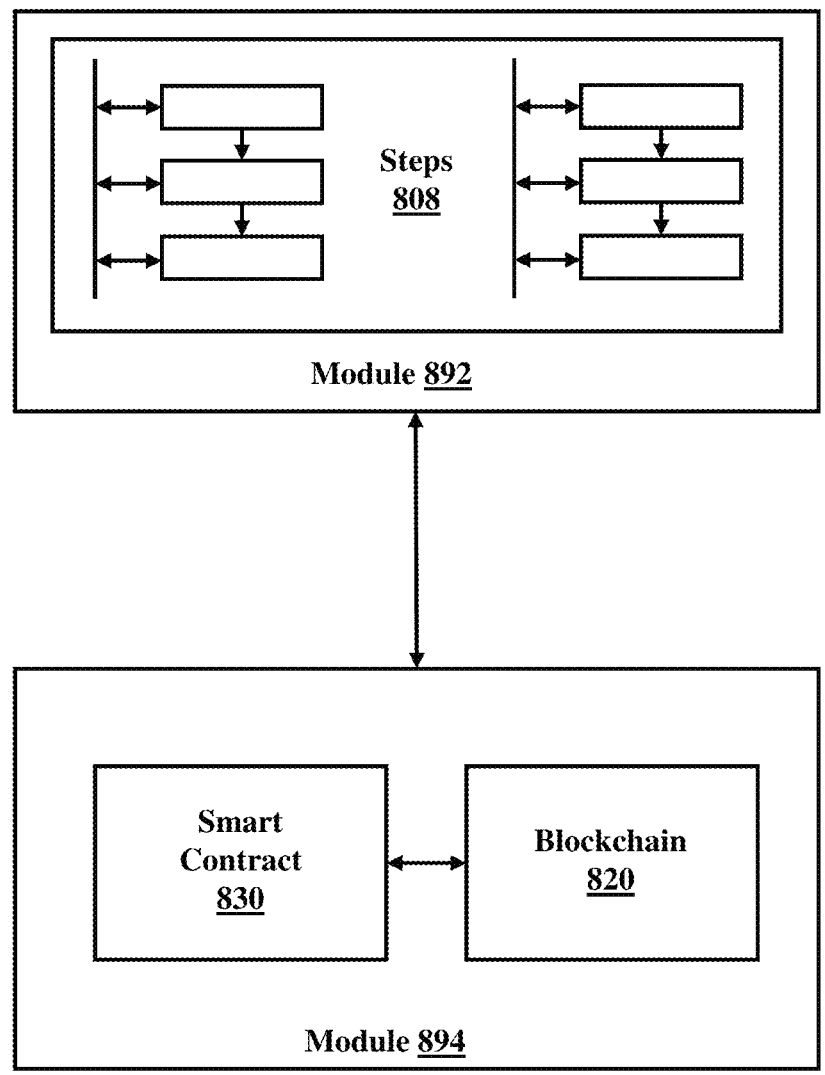
FIG. 8D illustrates another example system configured to perform one or more operations described herein, consistent with some embodiments.

FIG. 8D illustrates another example system configured to perform various operations, consistent with some embodiments. Referring to FIG. 8D, the system includes a module 892 and a module 894. The module 894 includes a blockchain 820 and a smart contract 830 (which may reside on the blockchain 820) that may execute any of the operational steps 878 (in module 892) included in any of the example embodiments. The steps/operations 878 may include one or more of the embodiments described or depicted and may represent output or written information that is written or read from one or more smart contracts 830 and/or blockchains 820. The physical module 892 and the module 894 may include one or more computers, servers, processors, memories, and/or wireless communication devices. Further, the module 892 and the module 894 may be the same module.

Figure 8E:
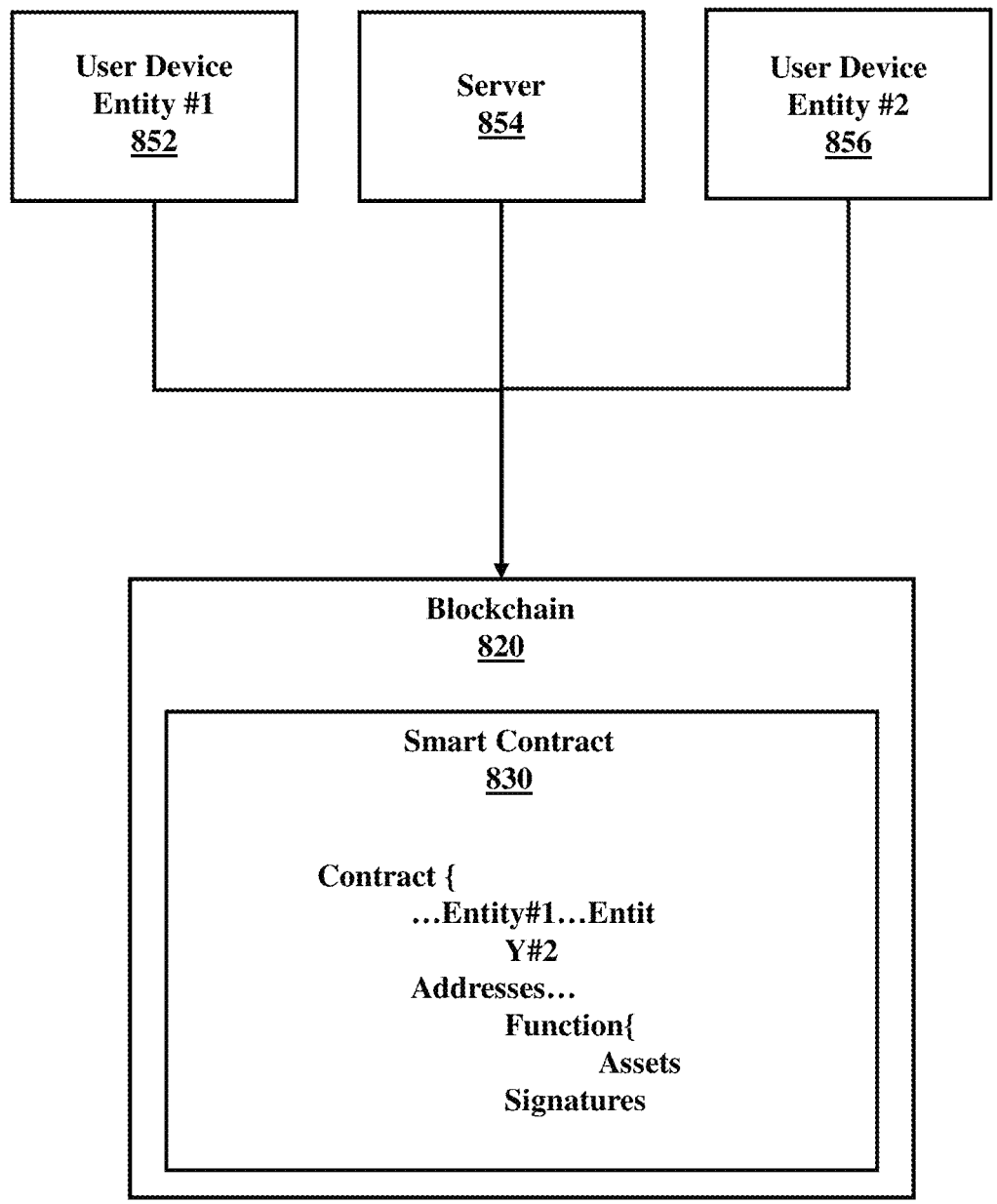
FIG. 8E illustrates a further example system configured to utilize a smart contract, consistent with some embodiments.

FIG. 8E illustrates an example system configured to utilize a smart contract configuration among contracting parties and a mediating server configured to enforce the smart contract terms on the blockchain 820, consistent with some embodiments. Referring to FIG. 8E, the configuration may represent a communication session, an asset transfer session, or a process or procedure that is driven by a smart contract 830, which explicitly identifies one or more user devices 852 and/or 856. The execution, operations, and results of the smart contract execution may be managed by a server 854. Content of the smart contract 830 may require digital signatures by one or more of the entities 852 and 856, which are parties to the smart contract transaction. The results of the smart contract execution may be written to a blockchain 820 as a blockchain transaction. The smart contract 830 resides on the blockchain 820, which may reside on one or more computers, servers, processors, memories, and/or wireless communication devices.

Figure 8F:
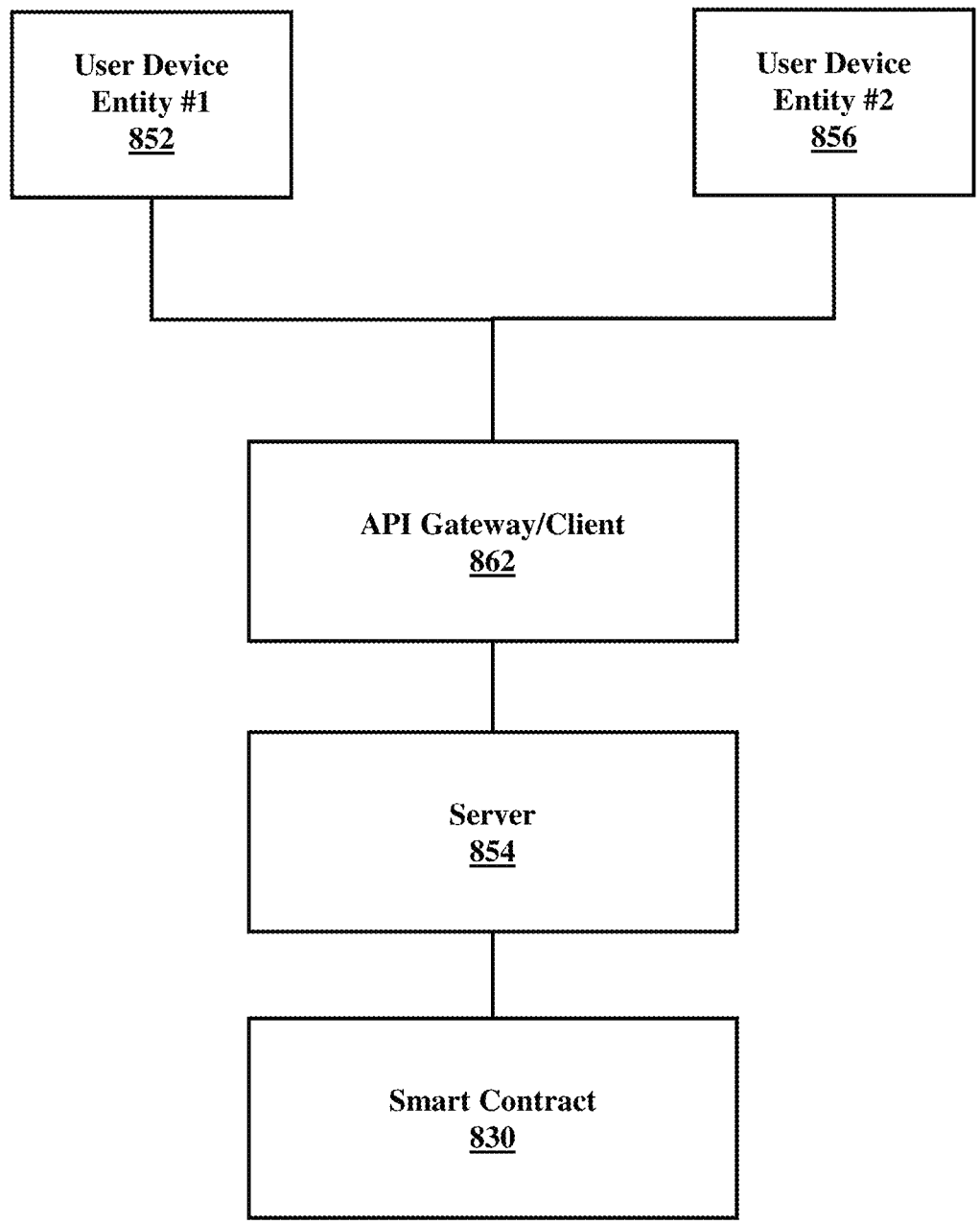
FIG. 8F illustrates a system including a blockchain, consistent with some embodiments.

FIG. 8F illustrates a system 860, including a blockchain, consistent with some embodiments. Referring to the example of FIG. 8D, an application programming interface (API) gateway 862 provides a common interface for accessing blockchain logic (e.g., smart contract 830 or other chaincode) and data (e.g., distributed ledger, etc.). In this example, the API gateway 862 is a common interface for performing transactions (invoke, queries, etc.) on the blockchain by connecting one or more entities 852 and 856 to a blockchain peer (i.e., server 854). Here, the server 854 is a blockchain network peer component that holds a copy of the world state and a distributed ledger allowing clients 852 and 856 to query data on the world stage as well as submit transactions into the blockchain network where depending on the smart contract 830 and endorsement policy, endorsing peers will run the smart contracts 830.

Block Processing

Figure 9A:
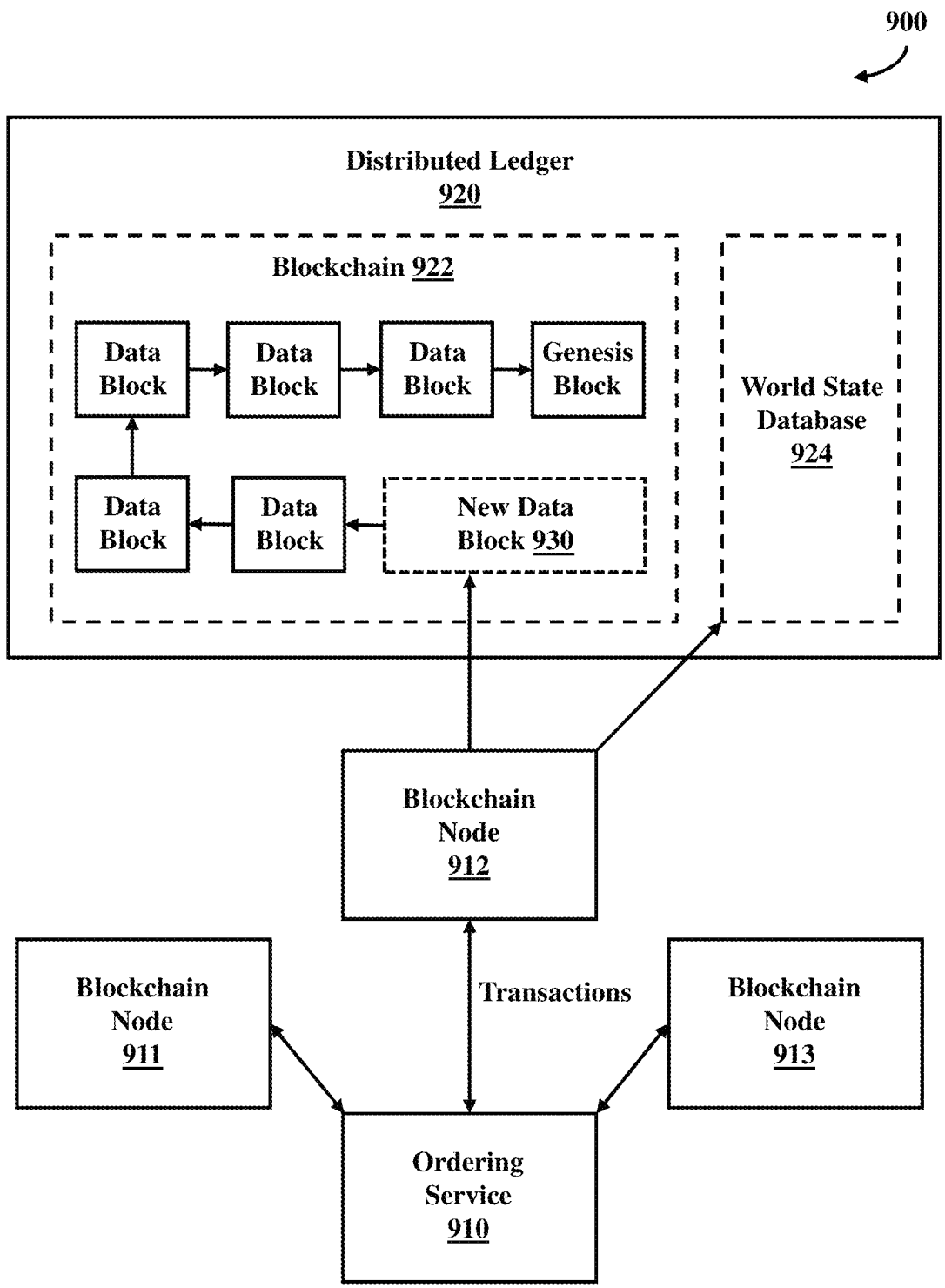
FIG. 9A illustrates a process for a new block being added to a distributed ledger, according to example embodiments.

FIG. 9A illustrates a process 900 of a new data block 930 being added to a distributed ledger 920, consistent with some embodiments, and FIG. 7B illustrates contents of a new data block 930 for blockchain, consistent with some embodiments. The new data block 930 may contain document linking data.

Referring to FIG. 9A, clients (not shown) may submit transactions to blockchain nodes 911, 912, and/or 913. Clients may be instructions received from any source to enact activity on the blockchain 922. As an example, clients may be applications that act on behalf of a requester, such as a device, person, or entity to propose transactions for the blockchain. The plurality of blockchain peers (e.g., blockchain nodes 911, 912, and 913) may maintain a state of the blockchain network and a copy of the distributed ledger 920. Different types of blockchain nodes/peers may be present in the blockchain network including endorsing peers which simulate and endorse transactions proposed by clients and committing peers which verify endorsements, validate transactions, and commit transactions to the distributed ledger 920. In some embodiments, the blockchain nodes 911, 912, and 913 may perform the role of endorser node, committer node, or both.

Figure 9B:
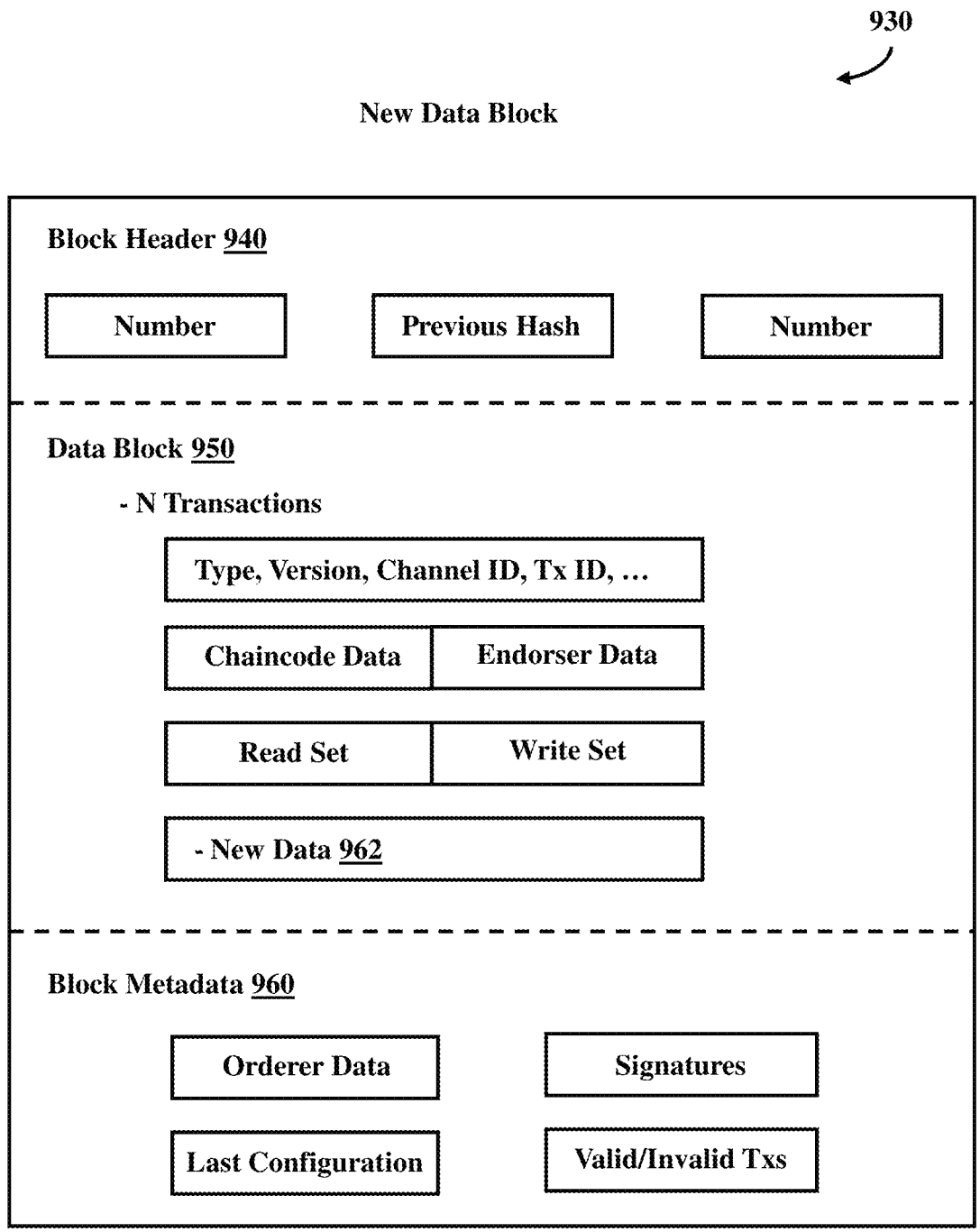
FIG. 9B illustrates contents of a new data block, according to example embodiments.

The distributed ledger 920 may include a blockchain which stores immutable, sequenced records in blocks, and a state database 924 (current world state) maintaining a current state of the blockchain 922. One distributed ledger 920 may exist per channel and each peer maintains its own copy of the distributed ledger 920 for each channel of which they are a member. The blockchain 922 may be a transaction log, structured as hash-linked blocks where each block contains a sequence of N transactions. Blocks may include various components such as shown in FIG. 9B. The linking of the blocks (shown by arrows in FIG. 9A) may be generated by adding a hash of a prior block's header within a block header of a current block. In this way, all transactions on the blockchain 922 may be sequenced and cryptographically linked together preventing tampering with blockchain data without breaking the hash links. Furthermore, because of the links, the latest block in the blockchain 922 represents every transaction that has come before it. The blockchain 922 may be stored on a peer file system (local or attached storage), which supports an append-only blockchain workload.

The current state of the blockchain 922 and the distributed ledger 920 may be stored in the state database 924. Here, the current state data represents the latest values for all keys ever included in the chain transaction log of the blockchain 922. Chaincode invocations execute transactions against the current state in the state database 924. To make these chaincode interactions more efficient, the latest values of all keys may be stored in the state database 924. The state database 924 may include an indexed view into the transaction log of the blockchain 922, it can therefore be regenerated from the chain at any time. The state database 924 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 910.

The ordering service 910 accepts endorsed transactions, orders them into a block, and delivers the blocks to the committing peers. For example, the ordering service 910 may initiate a new block when a threshold of transactions has been reached, a timer times out, or another condition. In the example of FIG. 9A, blockchain node 912 is a committing peer that has received a new data new data block 930 for storage on blockchain 922. The first block in the blockchain may be referred to as a genesis block, which includes information about the blockchain, its members, the data stored therein, etc.

The ordering service 910 may be made up of a cluster of ordering nodes. The ordering service 910 in some embodiments may not process transactions, smart contracts, or maintain the shared ledger. Rather, the ordering service 910 in these embodiments may accept the endorsed transactions and specify the order in which those transactions are committed to the distributed ledger 920. The architecture of the blockchain network may be designed such that the specific implementation of "ordering" (e.g., Solo, Kafka, BFT, etc.) becomes a pluggable component.

Transactions in some embodiments may be written to the distributed ledger 920 in a consistent order. The order of transactions in these embodiments may be established to ensure that the updates to the state database 924 are valid when they are committed to the network. Unlike a cryptocurrency blockchain system (e.g., Bitcoin, etc.), where ordering occurs through the solving of a cryptographic puzzle, or mining, in this example the parties of the distributed ledger 920 may choose the ordering mechanism that best suits that network.

In some embodiments, when the ordering service 910 initializes a new data block 930, the new data block 930 may be broadcast to committing peers (e.g., blockchain nodes 911, 912, and 913). In response, each committing peer may validate the transaction within the new data block 930 by checking to make sure that the read set and the write set still match the current world state in the state database 924. Specifically, the committing peer may determine whether the read data that existed when the endorsers simulated the transaction is identical to the current world state in the state database 924. When the committing peer validates the transaction, the transaction may be written to the blockchain 922 on the distributed ledger 920, and the state database 924 may be updated with the write data from the read-write set. In some embodiments, if a transaction fails (e.g., if the committing peer finds that the read-write set does not match the current world state in the state database 924), the transaction ordered into a block may still be included in that block, but marked as invalid, and the state database 924 not updated.

Referring to FIG. 9B, a new data block 930 (also referred to as a data block) that is stored on the blockchain 922 of the distributed ledger 920 may include multiple data segments in some embodiments, such as a block header 940, block data 950, and block metadata 960. It should be appreciated that the various depicted blocks and their contents, such as new data block 930 and its contents, shown in FIG. 9B are merely examples and are not meant to limit the scope of the example embodiments. The new data block 930 may store transactional information of N transaction(s) (e.g., 1, 10, 100, 200, 1000, 2000, 3000, etc.) within the block data 950. The new data block 930 may also include a link to a previous block (e.g., on the blockchain 922 in FIG. 9A) within the block header 940. In particular, the block header 940 may include a hash of a previous block's header. The block header 940 may also include a unique block number, a hash of the block data 950 of the new data block 930, and the like. The block number of the new data block 930 may be unique and assigned in various orders, such as an incremental/sequential order starting from zero.

The block data 950 may store transactional information of each transaction that is recorded within the new data block 930. For example, the transaction data may include one or more of: a type of the transaction, a version, a timestamp, a channel ID of the distributed ledger 920, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 950 may also store new data 962, which adds additional information to the hash-linked chain of blocks in the blockchain 922. The additional information may include one or more of the steps, features, processes and/or actions described or depicted herein. Accordingly, the new data 962 may be stored in an immutable log of blocks on the distributed ledger 920. Some of the benefits of storing such new data 962 are reflected in the various embodiments disclosed and depicted herein. Although in FIG. 9B the new data 962 is depicted in the block data 950, it could also be located in the block header 940 or the block metadata 960 in some embodiments. The new data 962 may also include a document composite key that is used for linking the documents within an organization.

The block metadata 960 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 910. Meanwhile, a committer of the block (such as blockchain node 912) may add validity/invalidity information based on an endorsement policy, verification of read/write sets, and the like. The transaction filter may include a byte array of a size equal to the number of transactions in the block data 950 and a validation code identifying whether a transaction was valid/invalid.

Figure 9C:
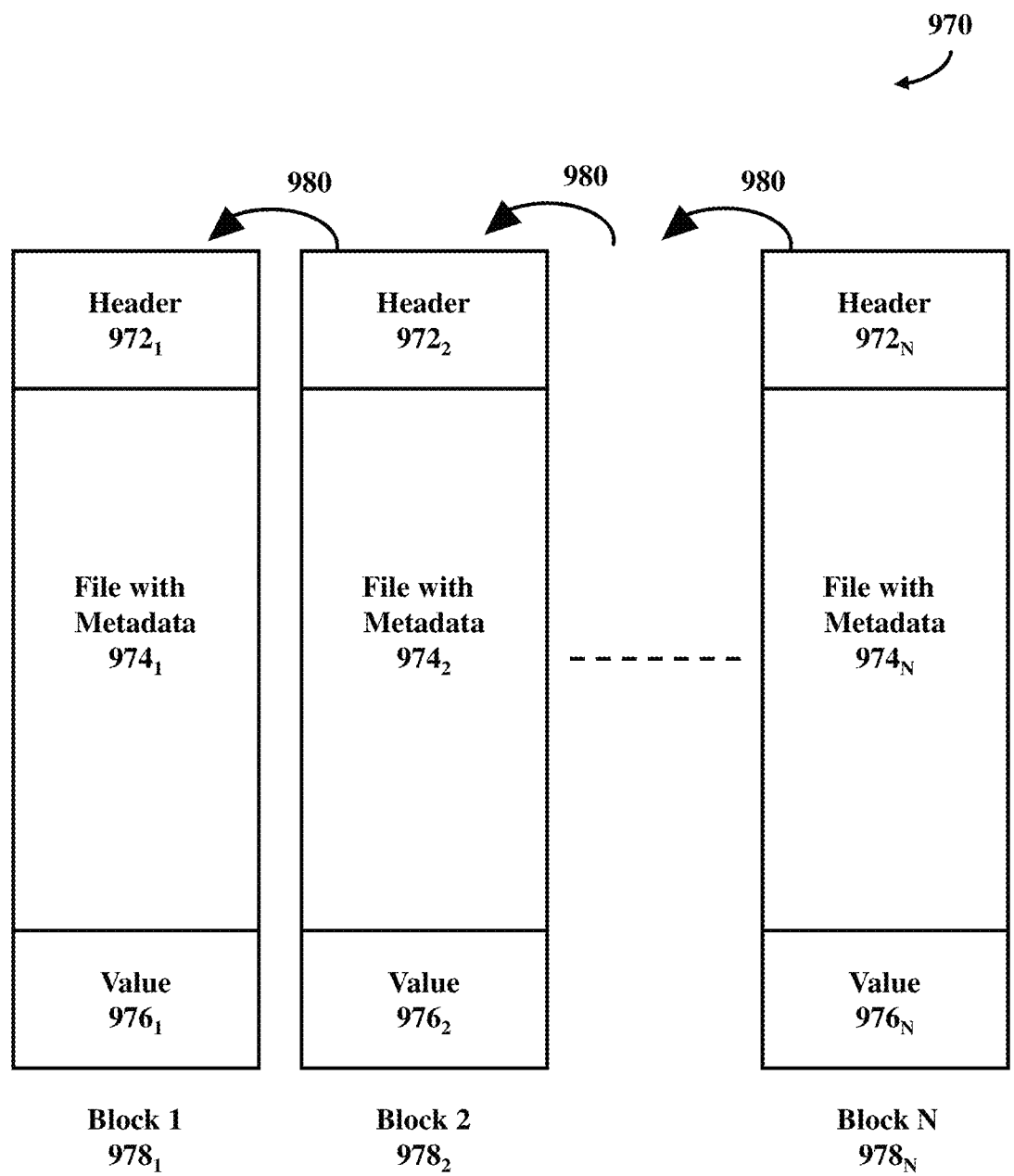
FIG. 9C illustrates a blockchain for digital content, according to example embodiments.

FIG. 9C illustrates an embodiment of a blockchain 970 for digital content, consistent with some embodiments. The digital content may include one or more files and associated information. The files may include transaction data, media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may not be included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 970 includes a number of blocks $978_1$, $978_2$, . . . $978_N$ cryptographically linked in an ordered sequence, where N≥1. The encryption used to link the blocks $978_1$, $978_2$, ... $978_N$ may be any of a number of keyed or un-keyed Hash functions. In one embodiment, the blocks $978_1$, $978_2$, ... $978_N$ are subject to a hash function that produces n-bit alphanumeric outputs (where n is 256 or another number) from inputs that are based on information in the blocks. Examples of such a hash function include, but are not limited to: an SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $978_1$, $978_2$, ... , $978_N$ may be cryptographically linked by a function that is different from a hash function. For purposes of illustration, the following description is made with reference to a hash function, e.g., SHA-2.

Each of the blocks $978_1$, $978_2$, ..., $978_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $978_1$ in the blockchain is referred to as the genesis block and may include the header $972_1$, original file $974_1$, and an initial value $976_1$. The hashing scheme used for the genesis block, and indeed in all subsequent blocks, may vary. For example, all the information in the first block $978_1$ may be hashed together and at one time, or each or a portion of the information in the first block $978_1$ may be separately hashed, and then a hash of the separately hashed portions may be performed.

The header $972_1$ may include one or more initial parameters, which, for example, may include a version number, timestamp, nonce, root information, difficulty level, consensus protocol, duration, media format, source, descriptive keywords, and/or other information associated with original file $974_1$ and/or the blockchain. The header $972_1$ may be generated automatically (e.g., by blockchain network managing software) or manually by a blockchain participant. Unlike the header in other blocks $978_2$ to $978_N$ in the blockchain, the header $972_1$ in the genesis block may not reference a previous block, simply because there is no previous block.

The original file $974_1$ in the genesis block may be, for example, data as captured by a device with or without processing prior to its inclusion in the blockchain. The original file $974_1$ may be received through the interface of the system from the device, media source, or node. The original file $974_1$ may be associated with metadata, which, for example, may be generated by a user, the device, and/or the system processor, either manually or automatically. The metadata may be included in the first block $978_1$ in association with the original file $974_1$.

The value $976_1$ in the genesis block may be an initial value generated based on one or more unique attributes of the original file $974_1$. In one embodiment, the one or more unique attributes may include the hash value for the original file $974_1$, metadata for the original file $974_1$, and other information associated with the file. In one implementation, the initial value $976_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $978_2$ to $978_N$ in the blockchain also have headers, files, and values. However, unlike the header $972_1$ of the first block, each of the headers $972_2$ to $972_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 980, to establish an auditable and immutable chain-of-custody.

Each of the header $972_2$ to $972_N$ in the other blocks may also include other information, e.g., version number, timestamp, nonce, root information, difficulty level, consensus protocol, and/or other parameters or information associated with the corresponding files and/or the blockchain in general.

The files $974_2$ to $974_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing, which involves analyzing a file, may include, for example, appending, including, or otherwise associating various analytics, statistics, or other information associated with the file.

The values in each of the other blocks $976_2$ to $976_N$ in the other blocks are unique values and are all different as a result of the processing performed. For example, the value in any one block corresponds to an updated version of the value in the previous block. The update is reflected in the hash of the block to which the value is assigned. The values of the blocks, therefore, provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block, including the redacted file, will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 9D illustrates an embodiment of a block, which may represent the structure of the blocks in the blockchain 990, consistent with some embodiments. The block, $Block_i$, may include a header 972$_i$, a file 974$_i$, and a value 976$_i$.

The header 972$i$ may include a hash value of a previous block $Block_{i-1}$ and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file 974$_i$ may include a plurality of data, such as Data 1, Data 2, . . . , Data N in sequence. The data are tagged with Metadata 1, Metadata 2, . . . , Metadata N, which describe the content and/or characteristics associated with the data. For example, the metadata for each data may include: information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , $REF_N$ to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value 976$_i$ in some embodiments may be a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 970 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

GENERAL

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method comprising:
utilizing a trusted circle of Internet of Things (IoT) devices to support a circle of trust containing IoT devices by exchanging information within the circle of trust, wherein the IoT devices within the circle of trust function as peers in a blockchain environment such that they are able to acquire software images from the trusted circle of IoT devices, share software images to and from other IoT devices within the circle of trust, and protect software images from being divulged to an unauthorized party using a blockchain protocol;
periodically polling each of the Internet of things (IoT) devices that is registered to be utilized in the trusted circle of IoT devices to determine the operational status;
in response to determining that the IoT device is working correctly, collecting input data about the working device;
generating a risk score as a weighted measure of the collected input data and a frequency of failure of the IoT device, wherein the risk score indicates an estimate of future loss of function of the IoT device, wherein the risk score is generated by the following:
performing a Latent Dirichlet Allocation (LDA) analysis for topic modeling and extracting features from a document;
using a Bidirectional Encoder Representations from Transformers (BERT) model to extract a start and stop end span from a paragraph of the document;
using the BERT model to generate a sentiment from an output of the LDA analysis by computing measures or characterizations of input text using the extracted start and stop end span, wherein one or more measures or characterizations have a singular or multi-response which is associated with hidden topics and/or categories forming a data set; and
splitting the data set into a training set and a test set, wherein the training set is used train a model to calculate an initial risk score for a failure mode of the IoT device and/or components thereof, wherein the test set is used to update the initial risk score;
determining an optimal time to trigger a predictive notification pertaining to the IoT device using the risk score; and
at the determined optimal time, issuing the predictive notification about the working devices.

2. The method of claim 1, wherein the input data comprises a plurality of unstructured comments on a public web site directed to the IoT device.

3. The method of claim 2, further comprising crawling the public web site to obtain the unstructured comments from owners of the IoT device.

4. The method of claim 2, wherein the input data comprises customer reviews of the IoT device.

5. The method of claim 4, wherein the input data further comprises internal maintenance records for the IoT device.

6. The method of claim 2, wherein the input data further comprises manufacturer data and build information, wherein the manufacturer data includes one or more notices, recalls, and advisories associated with the IoT device.

7. The method of claim 2, further comprising using natural language processing (NLP) with GaussianNB Classifier to parse the plurality of unstructured comments.

8. The method of claim 1, further comprising aggregating one or more predictive notifications in a dashboard.

9. The method of claim 1, wherein each of the IoT devices in the circle of trust has a same copy of data held in ledgers stored within blockchains associated with the respective IoT device in the circle of trust.

10. The method of claim 9, wherein a first IoT device within the circle of trust sends a transaction to the trusted circle of IoT devices, wherein the trusted circle of IoT devices sends the transaction to a second IoT device within the circle of trust, wherein the second IoT device sends the transaction to ledgers of blockchains that are associated with other IoT devices within the circle of trust, wherein the transaction is stored in a block of the respective blockchain, wherein the block includes a hash of data from an older block.

11. The method of claim 1, wherein the registering of the IoT device in the trusted circle of IoT devices comprises:
capturing an image of the IoT device; and
extracting information about the IoT device from the image, wherein the extracted information comprises a manufacturer name, a model number, and a serial number.

12. The method of claim 11, further comprising retrieving the input data using the extracted information.

13. The method of claim 1, further comprising periodically poll the IoT device to determine an operational status.

14. The method of claim 1, wherein the predictive notification recommends changing a filter of the IoT device.

15. The method of claim 1, wherein the predictive notification indicates that a warranty of the IoT device is about to expire.

16. A computer program product, the computer program product comprising:
one or more computer readable storage media, and program instructions collectively stored on the one or more computer readable storage media, the program instructions comprising:
program instructions to utilize a trusted circle of Internet of Things (IoT) devices to support a circle of trust containing IoT devices by exchanging information within the circle of trust, wherein the IoT devices within the circle of trust function as peers in a blockchain environment such that they are able to acquire software images from the trusted circle of IoT devices, share software images to and from other IoT devices within the circle of trust, and protect software images from being divulged to an unauthorized party using a blockchain protocol;
program instructions to periodically poll each of the Internet of things (IoT) devices that is registered to be utilized in the trusted circle of IoT devices to determine the operational status;
in response to determining that the IoT device is working correctly, program instructions to collect input data about the working device;
program instructions to generate a risk score as a weighted measure of the collected input data and a frequency of failure of the IoT device, wherein the risk score indicates an estimate of future loss of function of the IoT device, wherein the risk score is generated by the following:

performing a Latent Dirichlet Allocation (LDA) analysis for topic modeling and extracting features from a document;

using a Bidirectional Encoder Representations from Transformers (BERT) model to extract a start and stop end span from a paragraph of the document;

using the BERT model to generate a sentiment from an output of the LDA analysis by computing measures or characterizations of input text using the extracted start and stop end span, wherein one or more measures or characterizations have a singular or multi-response which is associated with hidden topics and/or categories forming a data set; and splitting the data set into a training set and a test set, wherein the training set is used train a model to calculate an initial risk score for a failure mode of the IoT device and/or components thereof, wherein the test set is used to update the initial risk score;

program instructions to determine an optimal to trigger a predictive notification pertaining to the IoT device using the risk score; and program instructions to issue the predictive notification about the working devices at the determined optimal time.

17. A system for a plurality of Internet of Things (IoT) devices, comprising one or more processors operably connected to a memory, the memory containing program instructions to, when executed on the one or more processors:

utilizing a trusted circle of Internet of Things (IoT) devices to support a circle of trust containing IoT devices by exchanging information within the circle of trust, wherein the IoT devices within the circle of trust function as peers in a blockchain environment such that they are able to acquire software images from the trusted circle of IoT devices, share software images to and from other IoT devices within the circle of trust, and protect software images from being divulged to an unauthorized party using a blockchain protocol;

periodically polling each of the Internet of things (IoT) devices that is registered to be utilized in the trusted circle of IoT devices to determine the operational status;

in response to determining that the IoT device is working correctly, collecting input data about the working device;

generating a risk score as a weighted measure of the collected input data and a frequency of failure of the IoT device, wherein the risk score indicates an estimate of future loss of function of the IoT device, wherein the risk score is generated by the following:

performing a Latent Dirichlet Allocation (LDA) analysis for topic modeling and extracting features from a document;

using a Bidirectional Encoder Representations from Transformers (BERT) model to extract a start and stop end span from a paragraph of the document;

using the BERT model to generate a sentiment from an output of the LDA analysis by computing measures or characterizations of input text using the extracted start and stop end span, wherein one or more measures or characterizations have a singular or multi-response which is associated with hidden topics and/or categories forming a data set; and splitting the data set into a training set and a test set, wherein the training set is used train a model to calculate an initial risk score for a failure mode of the IoT device and/or components thereof, wherein the test set is used to update the initial risk score;

determining an optimal time to trigger a predictive notification pertaining to the IoT device using the risk score; and at the determined optimal time, issuing the predictive notification about the working devices.

18. The system of claim 17, wherein the input data comprises customer reviews of the IoT device.

19. The system of claim 18, further comprising program instructions to use natural language processing (NLP) to parse the customer reviews of the IoT device.

20. The system of claim 17, further comprising program instructions to aggregate one or more predictive notifications in a dashboard.

* * * * *